US010986340B2

(12) United States Patent
Egilmez et al.

(10) Patent No.: US 10,986,340 B2
(45) Date of Patent: Apr. 20, 2021

(54) CODING ADAPTIVE MULTIPLE TRANSFORM INFORMATION FOR VIDEO CODING

(71) Applicant: QUALCOMM Incorporated, San Diego, CA (US)

(72) Inventors: Hilmi Enes Egilmez, San Diego, CA (US); Yung-Hsuan Chao, San Diego, CA (US); Amir Said, San Diego, CA (US); Vadim Seregin, San Diego, CA (US); Marta Karczewicz, San Diego, CA (US); Wei-Jung Chien, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/426,749

(22) Filed: May 30, 2019

(65) Prior Publication Data
US 2019/0373261 A1  Dec. 5, 2019

Related U.S. Application Data

(60) Provisional application No. 62/679,570, filed on Jun. 1, 2018.

(51) Int. Cl.
*H04N 19/12* (2014.01)
*H04N 19/46* (2014.01)
(Continued)

(52) U.S. Cl.
CPC .......... *H04N 19/12* (2014.11); *H04N 19/176* (2014.11); *H04N 19/186* (2014.11); *H04N 19/1887* (2014.11); *H04N 19/46* (2014.11)

(58) Field of Classification Search
USPC .................................................. 375/240.02
See application file for complete search history.

(56) References Cited

U.S. PATENT DOCUMENTS 9,319,684 B2    4/2016  Karczewicz et al.
2013/0114669 A1*  5/2013  Karczewicz ......... H04N 19/186
                                             375/240.02
(Continued)

FOREIGN PATENT DOCUMENTS

WO   2019076206 A1   4/2019

OTHER PUBLICATIONS

Chen J., et al., JVET-G1001-V1 "Algorithm Description of Joint Exploration Test Model 7 (JEM7)", Joint Video Exploration Team (JVET)of ITU-T SG 16 WP 3 and ISO/IEC JTC 1/SC 29/WG 11, 7th Meeting, Jul. 13, 2017-Jul. 21, 2017, Torino, Aug. 19, 2017 (Aug. 19, 2017), 48 Pages, XP030150980, pp. i-iv, Retrieved from the Internet: URL: http://phenix.int-evry.fr/jvet/doc_end_user/documents/7_Torino/wg11/JVET-G0001-v1.zip, p. 20, Paragraph 2.3.7-p. 23, Paragraph 2.3.7.6, p. 17, Paragraph 2.3.5-p. 18, section 2.

(Continued)

*Primary Examiner* — Behrooz M Senfi
(74) *Attorney, Agent, or Firm* — Shumaker & Sieffert, P.A.

(57) ABSTRACT

An example device for decoding video data includes a memory configured to store video data; and a processor implemented in circuitry and configured to decode a truncated unary codeword representing a multiple transform (MT) scheme for a current block of the video data to determine the MT scheme; apply the MT scheme to transform coefficients of the current block to produce residual data for the current block of video data; and decode the current block using the residual data. The MT scheme may include a plurality of transforms, such as a horizontal transform and a vertical transform, a primary transform and a second transform, or any combination of separable and/or non-separable transforms. Thus, a single truncated unary (Continued)

codeword may represent the entire MT scheme, that is, each of a plurality of transforms of the MT scheme.

47 Claims, 12 Drawing Sheets

(51) Int. Cl.
  *H04N 19/186* (2014.01)
  *H04N 19/176* (2014.01)
  *H04N 19/169* (2014.01)

(56) References Cited

U.S. PATENT DOCUMENTS

| | | | | |
|---|---|---|---|---|
| 2014/0140400 | A1* | 5/2014 | George | H04N 19/61 |
| | | | | 375/240.12 |
| 2015/0071359 | A1* | 3/2015 | Guo | H04N 19/13 |
| | | | | 375/240.18 |
| 2016/0219290 | A1* | 7/2016 | Zhao | H04N 19/112 |
| 2018/0020218 | A1 | 1/2018 | Zhao et al. | |
| 2018/0063553 | A1 | 3/2018 | Zhang et al. | |
| 2018/0098081 | A1 | 4/2018 | Zhao et al. | |
| 2018/0103252 | A1* | 4/2018 | Hsieh | H04N 19/1883 |
| 2018/0262777 | A1* | 9/2018 | Filippov | H04N 19/122 |
| 2018/0288437 | A1 | 10/2018 | Hsiang | |
| 2018/0288439 | A1 | 10/2018 | Hsu et al. | |
| 2019/0222853 | A1* | 7/2019 | Keinert | H04N 19/463 |
| 2020/0021852 | A1* | 1/2020 | Chao | H04N 19/12 |

OTHER PUBLICATIONS

International Search Report and Written Opinion—PCT/US2019/034918—ISA/EPO—dated Jul. 25, 2019.
Rosewarne C., et al., "CE6-Related: EMT Signalling", 11. JVET Meeting; Jul. 11, 2018-Jul. 18, 2018; Ljubljana; (The Joint Video Exploration Team of ISO/IEC JTC1/SC29/WG11 and ITU-T SG.16), No. JVET-K0113, Jul. 2, 2018 (Jul. 2, 2018), pp. 1-2, XP030198670, Retrieved from the Internet: URL: http://phenix.int-evry.fr/jvet/doc_end_user/documents/11_Ljubljana/wg11/JVET-K0113-v1.zip [retrieved on Jul. 2, 2018] p. 4-p. 6; table 1, Adaptive Multiple Core Transform; p. 28, paragraph 2.4-p. 31, paragraph 2.4.3.1; figure 25; tables 5,6.
ITU-T H.265, Series H: Audiovisual and Multimedia Systems, Infrastructure of audiovisual services—Coding of moving video, Advanced video coding for generic audiovisual services, The International Telecommunication Union. Dec. 2016, 664 pp.
Chen J., et al., "Algorithm Description of Joint Exploration Test Model 1," Joint Video Exploration Team (JVET) of ITU-T SG16 WP3 and ISO/IEC JTC1/SC29/WG11, 1nd Meeting: Geneva, CH, Oct. 19-21, 2015, JVET-A1001, 27 pp.
Wien M, "High Efficiency Video Coding", Coding Tools and specification, Chapter 5, 2015, pp. 133-160.
Jain A.K., "A sinusoidal family of unitary transforms", IEEE Transactions on Pattern Analysis and Machine Intelligence, Oct. 1, 1979, pp. 356-365, IEEE Service Center, XP011242370, ISSN: 0162-8828.
Martucci S.A., et al., "Symmetric convolution and the discrete sine and cosine transforms," IEEE Transactions on Signal Processing, vol. 42, No. 5, May 1, 1994, pp. 1038-1051, IEEE Signal Processing Society, XP000863873.
Han J., et al., "Towards jointly optimal spatial prediction and adaptive transform in video/image coding," IEEE International Conference on Acoustics, Speech and Signal Processing (ICASSP), pp. 726-729 (Mar. 2010).
IEEE Std 802.11ad-2012: "Part 11: Wireless LAN Medium Access Control (MAC) and Physical Layer (PHY) Specifications—Amendment 3: Enhancements for Very High Throughput in the 60 GHz Band", LAN/MAN Standards Committee of the IEEE Computer Society, Dec. 28, 2012, 628 Pages.
Ergen S., "ZigBee/IEEE 802.15.4 Summary", Sep. 10, 2004, 37 pp.
Marpe D., et al., "Transform Coding Using the Residual Quadtree (RQT)", Fraunhofer Heinrich Hertz Institute, 4pp. URL: http://www.hhi.fraunhofer.de/fields-of-competence/image-processing/researchgroups/image-video-coding/hevc-high-efficiency-video-coding/transform-coding-using-the-residual-quadtree-rqt.html ; [ Retrieved on Feb. 9, 2017].
Zhao X., et al., "Enhanced Multiple Transform for Video Coding", Data Compression Conference, Mar. 30, 2016, XP033027689, DOI: 10.1109/DCC.2016.9 [retrieved on Dec. 15, 2016], pp. 73-82.
Bossen F., et al., "JEM Software Manual," Joint Collaborative Team on Video Coding (JCT-VC) of ITU-T SG16 WP3 and ISO/IEC JTC1/SC29/WG11, Document: JCTVC-Software Manual, Retrieved on Aug. 3, 2016, pp. 1-29.
ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 pp.
Bross B., et al., "Versatile Video Coding (Draft 5)", Joint Video Experts Team (JVET) of ITU-T SG 16 WP 3 and ISO/IEC JTC 1/SC 29/WG 11, 14th Meeting: Geneva, CH, Mar. 19-27, 2019, JVET-N1001-v3, 371 pages.
Bross B., et al., "Versatile Video Coding (Draft 1)", Joint Video Experts Team (JVET) of ITU-T SG 16 WP 3 and ISO/IEC JTC 1/SC 29/WG 11, 10th Meeting, Apr. 2018, JVET-J1001-v2, 43 pages.
Chen J., et al., "Algorithm description for Versatile Video Coding and Test Model 1 (VTM 1)", Joint Video Exploration Team (JVET) of ITU-T SG 16 WP 3 and ISO/IEC JTC 1/SC 29/WG 11, 10th Meeting: San Diego, US, Apr. 10-20, 2018, Jun. 16, 2018, JVET-J1002-v2, 10 pages, XP030198635, http://phenix.int-evry.fr/jvet/doc_end_user/documents/10_SanDiego/wg11/JVET-J1002-v2.zip.
Chen J., et al., "Algorithm description for Versatile Video Coding and Test Model 3 (VTM 3)", Joint Video Experts Team (JVET) of ITU-T SG 16 WP 3 and ISO/IEC JTC 1/SC 29/WG 11, JVET-L1002-v1, 12th Meeting: Macao, CN, Oct. 3-12, 2018, 48 pages.

* cited by examiner (2 transforms)

(3 transforms)

CODING ADAPTIVE MULTIPLE TRANSFORM INFORMATION FOR VIDEO CODING

This application claims the benefit of U.S. Provisional Application No. 62/679,570, filed Jun. 1, 2018, the entire contents of which are hereby incorporated by reference.

TECHNICAL FIELD

This disclosure relates to video coding, including video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques related to transform coding in video coding. Transform coding is an important element of modern video compression standards. This disclosure describes multiple transform (MT), e.g., adaptive multiple transform (AMT), designs that use less signaling overhead as compared to previous AMT designs. Since the MT designs described in this disclosure have less signaling overhead, these techniques can improve coding gains and may be used in the context of advanced video codecs, such as extensions of HEVC or the next generation of video coding standards.

In one example, a method of decoding video data includes decoding a truncated unary codeword representing a multiple transform (MT) scheme for a current block of video data to determine the MT scheme; applying the MT scheme to transform coefficients of the current block to produce residual data for the current block of video data; and decoding the current block using the residual data.

In another example, a device for decoding video data includes a memory configured to store video data; and a processor implemented in circuitry and configured to: decode a truncated unary codeword representing a multiple transform (MT) scheme for a current block of the video data to determine the MT scheme; apply the MT scheme to transform coefficients of the current block to produce residual data for the current block of video data; and decode the current block using the residual data.

In another example, a computer-readable storage medium has stored thereon instructions that, when executed, cause a processor to decode a truncated unary codeword representing a multiple transform (MT) scheme for a current block of video data to determine the MT scheme; apply the MT scheme to transform coefficients of the current block to produce residual data for the current block of video data; and decode the current block using the residual data.

In another example, a device for decoding video data includes means for decoding a truncated unary codeword representing a multiple transform (MT) scheme for a current block of video data to determine the MT scheme; means for applying the MT scheme to transform coefficients of the current block to produce residual data for the current block of video data; and means for decoding the current block using the residual data.

In another example, a method of encoding video data includes applying a multiple transform (MT) scheme to residual data for a current block of video data to generate a block of transform coefficients; encoding a truncated unary codeword representing the MT scheme for the current block; and encoding the current block using the block of transform coefficients.

In another example, a device for encoding video data includes a memory configured to store video data; and a processor implemented in circuitry and configured to: apply a multiple transform (MT) scheme to residual data for a current block of the video data to generate a block of transform coefficients; encode a truncated unary codeword representing the MT scheme for the current block; and encode the current block using the block of transform coefficients.

In another example, a computer-readable storage medium has stored thereon instructions that, when executed, cause a processor to: apply a multiple transform (MT) scheme to residual data for a current block of the video data to generate a block of transform coefficients; encode a truncated unary codeword representing the MT scheme for the current block; and encode the current block using the block of transform coefficients.

In another example, a device for encoding video data includes means for applying a multiple transform (MT) scheme to residual data for a current block of video data to generate a block of transform coefficients; means for encoding a truncated unary codeword representing the MT scheme for the current block; and means for encoding the current block using the block of transform coefficients.

The details of one or more examples are set forth in the accompanying drawings and the description below. Other features, objects, and advantages will be apparent from the description and drawings, and from the claims.

DETAILED DESCRIPTION

Figure 1:
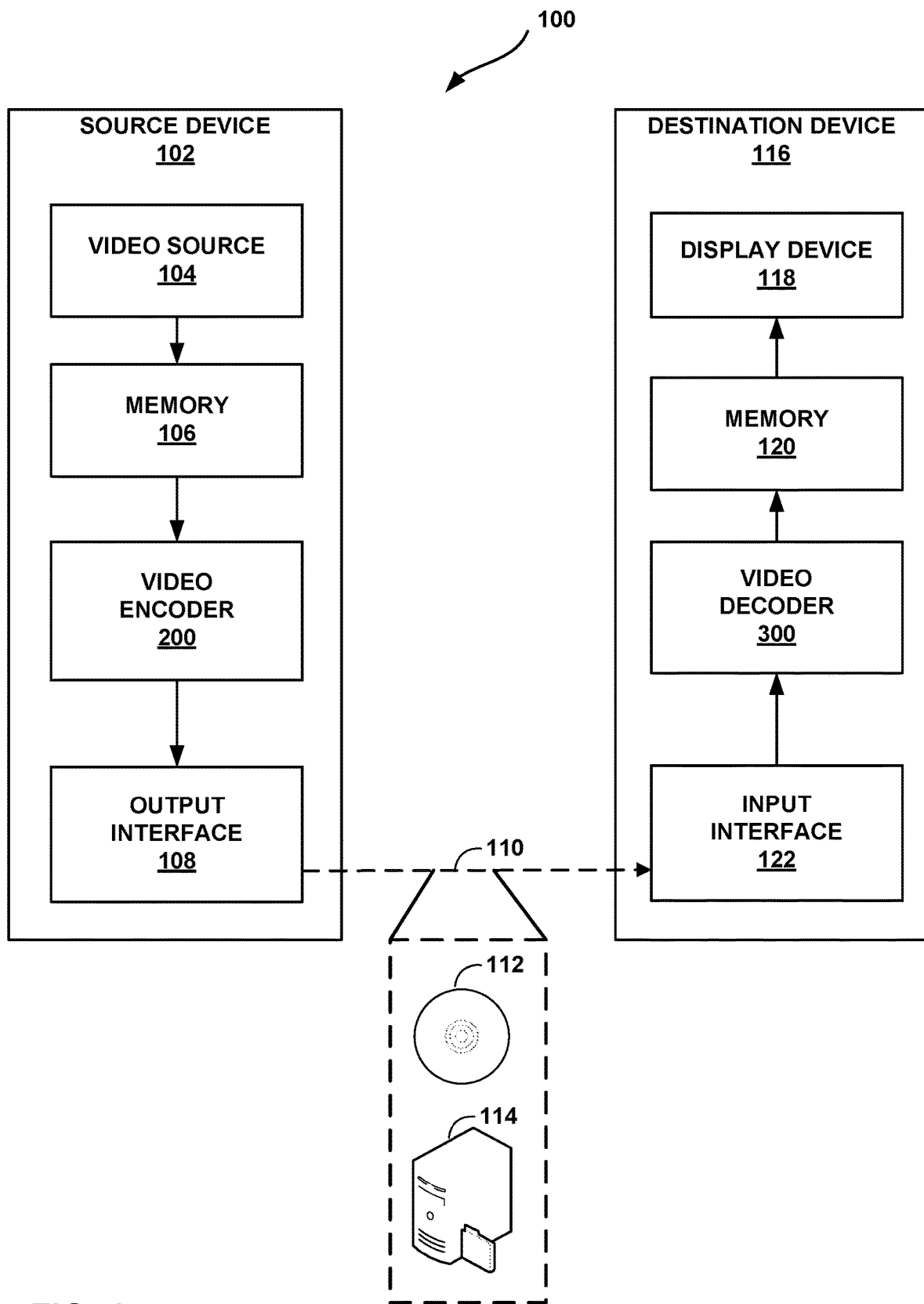
FIG. 1 is a block diagram illustrating an example video encoding and decoding system that may perform the techniques of this disclosure.

This disclosure describes techniques related to transform coding, which is an important element of modern video compression standards, e.g., as discussed in M. Wien, High Efficiency Video Coding: Coding Tools and Specification, Springer-Verlag, Berlin, 2015. This disclosure describes multiple transform (MT), e.g., adaptive multiple transform (AMT), techniques, which use less signaling overhead as compared to previous AMT designs, such as those described in U.S. patent application Ser. No. 15/005,736, filed Jan. 25, 2016, published as U.S. Patent Publication No. 2016/0219290, and in U.S. patent application Ser. No. 15/649,612, filed Jul. 13, 2017, published as U.S. Patent Publication No. 2018/0020218. Since the AMT designs described in this disclosure have less signaling overhead, these techniques can improve coding gains and may be used in the context of advanced video codecs, such as extensions of HEVC or the next generation of video coding standards.

In general, video data is represented as a sequential series of pictures. A video coder partitions the pictures into blocks, and codes each of the blocks. Coding generally includes prediction and residual coding. During prediction, the video coder may form a prediction block using intra-prediction (in which the prediction block is formed from neighboring, previously coded blocks of the same picture) or inter-prediction (in which the prediction block is formed from previously coded blocks of previously coded pictures). A residual block represents pixel-by-pixel differences between the prediction block and an original, uncoded block. A video encoder may apply a transform to the residual block to produce a transform block including transform coefficients, whereas a video decoder may apply an inverse transform to the transform block to reproduce a version of the residual block.

Transformation generally corresponds to the process of deriving an alternative representation of an input signal, e.g., a residual of an original block. Given an N-point vector $x=[x_0, x_1, \ldots, x_{N-1}]^T$ and a set of given vectors $\{\Phi_0, \Phi_1, \ldots, \Phi_{M-1}\}$, x can be approximated or exactly represented using a linear combination of $\Phi_0, \Phi_1, \ldots, \Phi_{M-1}$, which can be formulated as follows:

$$\hat{x} = \sum_{i=0}^{M-1} f_i \cdot \phi_i$$

where $\hat{x}$ can be an approximation or equivalent of x, vector $f=[f_1, f_2, \ldots, f_{M-1}]$ is called the transform coefficient vector, and $\{\Phi_0, \Phi_1, \ldots, \Phi_{M-1}\}$ are the transform basis vectors.

In the scenario of video coding, transform coefficients are roughly non-correlated and sparse. That is, the energy of the input vector x is compacted only on a few transform coefficients, and the remaining majority transform coefficients are typically close to 0.

Given the specific input data, an optimal transform in terms of energy compaction is the so-called Karhunen-Loeve transform (KLT), which uses eigen vectors of a covariance matrix of the input data as the transform basis vectors. Therefore, KLT is actually a data-dependent transform and does not have a general mathematical formulation. However, under certain assumptions, e.g., the input data forms a first-order stationary Markov processes, it has been proven in the literature that the corresponding KLT is actually a member of the sinusoidal family of unitary transforms, which is introduced in Jain, A. K., A sinusoidal family of unitary transforms, IEEE Trans. on Pattern Analysis and Machine Intelligence, 1, 356, 1979. The sinusoidal family of unitary transforms indicates transforms using transform basis vectors formulated as follows:

$$\Phi_m(k) = A \cdot e^{ik\theta} + B \cdot e^{-ik\theta}$$

where e is the base of the natural logarithm approximately equal to 2.71828, A, B, and θ are complex in general, and depend on the value of m.

Several well-known transforms, including the discrete Fourier, cosine, sine, and the KLT (for first-order stationary Markov processes), are members of this sinusoidal family of unitary transforms. According to S. A. Martucci, "Symmetric convolution and the discrete sine and cosine transforms," IEEE Trans. Sig. Processing SP-42, 1038-1051 (1994), the complete set of discrete cosine transform (DCT) and discrete sine transform (DST) families includes totally 16 transforms based on different types, i.e., different values of A, B, and θ, and a complete definition of the different types of DCT and DST are given below.

Assume the input N-point vector is denoted as $x=[x_0, x_1, \ldots, x_{N-1}]^T$, and it is transformed to another N-point transform coefficient vector denoted as $y=[y_0, y_1, \ldots, y_{N-1}]^T$ by multiplying a matrix, the process of which can be further illustrated according to one of the following transform formulations, wherein k ranges from 0 through N−1, inclusive:

$$y_k = \sum_{n=0}^{N-1} \sqrt{\frac{2}{N-1}} \cos\left(\frac{\pi \cdot n \cdot k}{N-1}\right) \cdot w_0 \cdot w_1 \cdot x_n, \quad \text{DCT Type-I(DCT-1)}$$

where $w_0 = \begin{cases} \frac{1}{\sqrt{2}}, & \text{if } n = 0 \text{ or } n = N-1 \\ 1, & \text{otheriwse} \end{cases}$, $w_1 = \begin{cases} \frac{1}{\sqrt{2}}, & \text{if } k = 0 \text{ or } k = N-1 \\ 1, & \text{otheriwse} \end{cases}$ $$y_k = \sum_{n=0}^{N-1} \sqrt{\frac{2}{N}} \cos\left(\frac{\pi \cdot (n+0.5) \cdot k}{N-1}\right) \cdot w_0 \cdot x_n, \quad \text{DCT Type-II(DCT-2)}$$

where $w_0 = \begin{cases} \frac{1}{\sqrt{2}}, & \text{if } k = 0 \\ 1, & \text{otheriwse} \end{cases}$ $$y_k = \sum_{n=0}^{N-1} \sqrt{\frac{2}{N}} \cos\left(\frac{\pi \cdot n \cdot (k+0.5)}{N}\right) \cdot w_0 \cdot x_n, \quad \text{DCT Type-III(DCT-3)}$$

where $w_0 = \begin{cases} \frac{1}{\sqrt{2}}, & \text{if } n = 0 \\ 1, & \text{otheriwse} \end{cases}$ $$y_k = \sum_{n=0}^{N-1} \sqrt{\frac{2}{N}} \cos\left(\frac{\pi \cdot (n+0.5) \cdot (k+0.5)}{N}\right) \cdot x_n, \quad \text{DCT Type-IV(DCT-4)}$$

$$y_k = \sum_{n=0}^{N-1} \sqrt{\frac{2}{N-0.5}} \cos\left(\frac{\pi \cdot n \cdot k}{N-0.5}\right) \cdot w_0 \cdot w_1 \cdot x_n, \quad \text{DCT Type-V(DCT-5)}$$

where $w_0 = \begin{cases} \frac{1}{\sqrt{2}}, & \text{if } n = 0 \\ 1, & \text{otheriwse} \end{cases}$, $w_1 = \begin{cases} \frac{1}{\sqrt{2}}, & \text{if } k = 0 \\ 1, & \text{otheriwse} \end{cases}$ $$y_k = \sum_{n=0}^{N-1} \sqrt{\frac{2}{N-0.5}} \cos\left(\frac{\pi \cdot (n+0.5) \cdot k}{N-0.5}\right) \cdot w_0 \cdot w_1 \cdot x_n, \quad \text{DCT Type-VI(DCT-6)}$$

where $w_0 = \begin{cases} \frac{1}{\sqrt{2}}, & \text{if } n = N-1 \\ 1, & \text{otheriwse} \end{cases}$, $w_1 = \begin{cases} \frac{1}{\sqrt{2}}, & \text{if } k = 0 \\ 1, & \text{otheriwse} \end{cases}$ -continued $$y_k = \sum_{n=0}^{N-1} \sqrt{\frac{2}{N-0.5}} \cos\left(\frac{\pi \cdot n \cdot (k+0.5)}{N-0.5}\right) \cdot w_0 \cdot w_1 \cdot x_n, \quad \text{DCT Type-VII(DCT-7)}$$

where $w_0 = \begin{cases} \frac{1}{\sqrt{2}}, & \text{if } n = 0 \\ 1, & \text{otheriwse} \end{cases}$, $w_1 = \begin{cases} \frac{1}{\sqrt{2}}, & \text{if } k = N-1 \\ 1, & \text{otheriwse} \end{cases}$ $$y_k = \sum_{n=0}^{N-1} \sqrt{\frac{2}{N+0.5}} \cos\left(\frac{\pi \cdot (n+0.5) \cdot (k+0.5)}{N+0.5}\right) \cdot x_n, \quad \text{DCT Type-VIII(DCT-8)}$$

$$y_k = \sum_{n=0}^{N-1} \sqrt{\frac{2}{N+1}} \sin\left(\frac{\pi \cdot (n+1) \cdot (k+1)}{N+1}\right) \cdot x_n, \quad \text{DST Type-I(DST-1)}$$

$$y_k = \sum_{n=0}^{N-1} \sqrt{\frac{2}{N}} \sin\left(\frac{\pi \cdot (n+0.5) \cdot (k+1)}{N}\right) \cdot w_0 \cdot x_n, \quad \text{DST Type-II(DST-2)}$$

where $w_0 = \begin{cases} \frac{1}{\sqrt{2}}, & \text{if } k = N-1 \\ 1, & \text{otheriwse} \end{cases}$ $$y_k = \sum_{n=0}^{N-1} \sqrt{\frac{2}{N}} \sin\left(\frac{\pi \cdot (n+1) \cdot (k+0.5)}{N}\right) \cdot w_0 \cdot x_n, \quad \text{DST Type-III(DST-3)}$$

where $w_0 = \begin{cases} \frac{1}{\sqrt{2}}, & \text{if } n = N-1 \\ 1, & \text{otheriwse} \end{cases}$ $$y_k = \sum_{n=0}^{N-1} \sqrt{\frac{2}{N}} \sin\left(\frac{\pi \cdot (n+0.5) \cdot (k+0.5)}{N}\right) \cdot x_n, \quad \text{DST Type-IV(DST-4)}$$

$$y_k = \sum_{n=0}^{N-1} \sqrt{\frac{2}{N+0.5}} \sin\left(\frac{\pi \cdot (n+1) \cdot (k+1)}{N+0.5}\right) \cdot x_n, \quad \text{DST Type-V(DST-5)}$$

$$y_k = \sum_{n=0}^{N-1} \sqrt{\frac{2}{N+0.5}} \sin\left(\frac{\pi \cdot (n+0.5) \cdot (k+1)}{N+0.5}\right) \cdot x_n, \quad \text{DST Type-VI(DST-6)}$$

$$y_k = \sum_{n=0}^{N-1} \sqrt{\frac{2}{N+0.5}} \sin\left(\frac{\pi \cdot (n+1) \cdot (k+0.5)}{N+0.5}\right) \cdot x_n, \quad \text{DST Type-VII(DST-7)}$$

-continued $$y_k = \sum_{n=0}^{N-1} \sqrt{\frac{2}{N-0.5}} \sin\left(\frac{\pi \cdot (n+0.5) \cdot (k+0.5)}{N-0.5}\right) \cdot$$ DST Type-VIII(DST-8)

$$w_0 \cdot w_1 \cdot x_n,$$

where $w_0 = \begin{cases} \frac{1}{\sqrt{2}}, & \text{if } n = N-1 \\ 1, & \text{otheriwse} \end{cases}$, $w_1 = \begin{cases} \frac{1}{\sqrt{2}}, & \text{if } k = N-1 \\ 1, & \text{otheriwse} \end{cases}$ The transform type is specified by the mathematical formulation of the transform basis function. For example, 4-point DST-VII and 8-point DST-VII have the same transform type, regardless of the value of N.

Without loss of generality, all the above transform types can be represented using the below generalized formulation:

$$y_m = \sum_{n=0}^{N-1} T_{m,n} \cdot x_n,$$

where T is the transform matrix specified by the definition of one certain transform, e.g., DCT Type-I~DCT Type-VIII, or DST Type-I~DST Type-VIII, and the row vectors of T, e.g., $[T_{i,0}, T_{i,1}, T_{i,2}, \ldots, T_{i,N-1}]$ are the $i^{th}$ transform basis vectors. A transform applied on the N-point input vector is called an N-point transform.

It is also noted that the above transform formulations, which are applied on the one-dimensional (1-D) input data x, can be represented in matrix multiplication form as below $$y = T \cdot x$$

where T indicates the transform matrix, x indicates the input data vector, and y indicates the output transform coefficients vector.

The transforms as introduced above are applied on 1-D input data, and transforms can be also extended for two-dimensional (2-D) input data sources. Supposing X is an input M×N data array. The typical methods of applying transform on 2-D input data include separable and non-separable 2-D transforms.

A separable 2-D transform applies 1-D transforms for the horizontal and vertical vectors of X sequentially, formulated as below:

$$Y = C \cdot X \cdot R^T$$

where C and R denote the given M×M and N×N transform matrices, respectively. From the formulation, it can be seen that C applies 1-D transforms for the column vectors of X, while R applies 1-D transforms for the row vectors of X In the later part of this disclosure, for simplicity, C and R are denoted as left (vertical) and right (horizontal) transforms and they both form a transform pair. There are cases when C is equal to R and is an orthogonal matrix. In such a case, the separable 2-D transform is determined by just one transform matrix.

A non-separable 2-D transform first reorganized all the elements of X into a single vector, namely X', by doing the following mathematical mapping as an example:

$$X'_{(i \cdot N+j)} = X_{i,j}$$

Then a 1-D transform T' is applied for X' as below:

$$Y = T' \cdot X$$

where T' is an (M*N)×(M*N) transform matrix.

In video coding, separable 2-D transforms are generally applied, since they require much fewer operation (addition and multiplication) counts, compared to 1-D transforms.

In some example video codecs, such as H.264/AVC, an integer approximation of the 4-point and 8-point Discrete Cosine Transform (DCT) Type-II is always applied for both Intra and Inter prediction residual. To better accommodate the various statistics of residual samples, more flexible types of transforms other than DCT Type-II are utilized in the new generation video codec. For example, in HEVC, an integer approximation of the 4-point Type-VII Discrete Sine Transform (DST) is utilized for Intra prediction residual, which is both theoretically proven and experimentally validated (in J. Han, A. Saxena and K. Rose, "Towards jointly optimal spatial prediction and adaptive transform in video/image coding," IEEE International Conference on Acoustics, Speech and Signal Processing (ICASSP), Mar. 2010, pp. 726-729) that DST Type-VII is more efficient than DCT Type-II for residuals vectors generated along the Intra prediction directions. For example, DST Type-VII is more efficient than DCT Type-II for row residual vectors generated by the horizontal Intra prediction direction. In HEVC, an integer approximation of 4-point DST Type-VII is applied only for 4×4 luma Intra prediction residual blocks. The 4-point DST-VII used in HEVC is shown below:

4×4 DST-VII:
{29, 55, 74, 84}
{74, 74, 0,−74}
{84,−29,−74, 55}
{55,−84, 74,−29}

In HEVC, for residual blocks that are not 4×4 luma Intra prediction residual blocks, integer approximations of the 4-point, 8-point, 16-point and 32-point DCT Type-II are also applied, as shown below:

4-point DCT-II:
{64, 64, 64, 64}
{83, 36,−36,−83}
{64,−64,−64, 64}
{36,−83, 83,−36}

8-point DCT-II:
{64, 64, 64, 64, 64, 64, 64, 64}
{89, 75, 50, 18,−18,−50,−75,−89}
{83, 36,−36,−83,−83,−36, 36, 83}
{75,−18,−89,−50, 50, 89, 18,−75}
{64,−64,−64, 64, 64,−64,−64, 64}
{50,−89, 18, 75,−75,−18, 89,−50}
{36,−83, 83,−36,−36, 83,−83, 36}
{18,−50, 75,−89, 89,−75, 50,−18}

16-point DCT-II:
{64, 64, 64, 64, 64, 64, 64, 64, 64, 64, 64, 64, 64, 64, 64, 64}
{90, 87, 80, 70, 57, 43, 25, 9, −9,−25,−43,−57,−70,−80,−87,−90}
{89, 75, 50, 18,−18,−50,−75,−89,−89,−75,−50,−18, 18, 50, 75, 89}
{87, 57, 9,−43,−80,−90,−70,−25, 25, 70, 90, 80, 43, −9,−57,−87}
{83, 36,−36,−83,−83,−36, 36, 83, 83, 36,−36,−83,−83,−36, 36, 83}
{80, 9,−70,−87,−25, 57, 90, 43,−43,−90,−57, 25, 87, 70, −9,−80}
{75,−18,−89,−50, 50, 89, 18,−75,−75, 18, 89, 50,−50,−89,−18, 75}
{70,−43,−87, 9, 90, 25,−80,−57, 57, 80,−25,−90, −9, 87, 43,−70}
{64,−64,−64, 64, 64,−64,−64, 64, 64,−64,−64, 64, 64,−64,−64, 64}

{57,−80,−25, 90, −9,−87, 43, 70,−70,−43, 87, 9,−90, 25, 80,−57}
{50,−89, 18, 75,−75,−18, 89,−50,−50, 89,−18,−75, 75, 18,−89, 50}
{43,−90, 57, 25,−87, 70, 9,−80, 80, −9,−70, 87,−25,−57, 90,−43}
{36,−83, 83,−36,−36, 83,−83, 36, 36,−83, 83,−36,−36, 83,−83, 36}
{25,−70, 90,−80, 43, 9,−57, 87,−87, 57, −9,−43, 80,−90, 70,−25}
{18,−50, 75,−89, 89,−75, 50,−18,−18, 50,−75, 89,−89, 75,−50, 18}
{9, −25, 43,−57, 70,−80, 87,−90, 90,−87, 80,−70, 57,−43, 25, −9}

32-point DCT-II:
{64,64,64,64,64,64,64,64,64,64,64,64,64,64,64,64,64,64,64,64,64,64,64,64,64,64,64,64,64,64,64,64}
{90,90,88,85,82,78,73,67,61,54,46,38,31,22,13,4,−4,−13,−22,−31,−38,−46,−54,−61,−67,−73,−78,−82,−85,−88,−90,−90}
{90,87,80,70,57,43,25,9,−9,−25,−43,−57,−70,−80,−87,−90,−90,−87,−80,−70,−57,−43,−25,−9,9,25,43,57,70,80,87,90}
{90,82,67,46,22,−4,−31,−54,−73,−85,−90,−88,−78,−61,−38,−13,13,38,61,78,88,90,85,73,54,31,4,−22,−46,−67,−82,−90}
{89,75,50,18,−18,−50,−75,−89,−89,−75,−50,−18,18,50,75,89,89,75,50,18,−18,−50,−75,−89,−89,−75,−50,−18,18,50,75,89}
{88,67,31,−13,−54,−82,−90,−78,−46,−4,38,73,90,85,61,22,−22,−61,−85,−90,−73,−38,4,46,78,90,82,54,13,−31,−67,−88}
{87,57,9,−43,−80,−90,−70,−25,25,70,90,80,43,−9,−57,−87,−87,−57,−9,43,80,90,70,25,−25,−70,−90,−80,−43,9,57,87}
{85,46,−13,−67,−90,−73,−22,38,82,88,54,−4,−61,−90,−78,−31,31,78,90,61,4,−54,−88,−82,−38,22,73,90,67,13,−46,−85}
{83,36,−36,−83,−83,−36,36,83,83,36,−36,−83,−83,−36,36,83,83,36,−36,−83,−83,−36,36,83,83,36,−36,−83,−83,−36,36,83}
{82,22,−54,−90,−61,13,78,85,31,−46,−90,−67,4,73,88,38,−38,−88,−73,−4,67,90,46,−31,−85,−78,−13,61,90,54,−22,−82}
{80,9,−70,−87,−25,57,90,43,−43,−90,−57,25,87,70,−9,−80,−80,−9,70,87,25,−57,−90,−43,43,90,57,−25,−87,−70,9,80}
{78,−4,−82,−73,13,85,67,−22,−88,−61,31,90,54,−38,−90,−46,46,90,38,−54,−90,−31,61,88,22,−67,−85,−13,73,82,4,−78}
{75,−18,−89,−50,50,89,18,−75,−75,18,89,50,−50,−89,−18,75,75,−18,−89,−50,50,89,18,−75,−75,18,89,50,−50,−89,−18,75}
{73,−31,−90,−22,78,67,−38,−90,−13,82,61,−46,−88,−4,85,54,−54,−85,4,88,46,−61,−82,13,90,38,−67,−78,22,90,31,−73}
{70,−43,−87,9,90,25,−80,−57,57,80,−25,−90,−9,87,43,−70,−70,43,87,−9,−90,−25,80,57,−57,−80,25,90,9,−87,−43,70}
{67,−54,−78,38,85,−22,−90,4,90,13,−88,−31,82,46,−73,−61,61,73,−46,−82,31,88,−13,−90,−4,90,22,−85,−38,78,54,−67}
{64,−64,−64,64,64,−64,−64,64,64,−64,−64,64,64,−64,−64,64,64,−64,−64,64,64,−64,−64,64,64,−64,−64,64,64,−64,−64,64}
{61,−73,−46,82,31,−88,−13,90,−4,−90,22,85,−38,−78,54,67,−67,−54,78,38,−85,−22,90,4,−90,13,88,−31,−82,46,73,−61}
{57,−80,−25,90,−9,−87,43,70,−70,−43,87,9,−90,25,80,−57,−57,80,25,−90,9,87,−43,−70,70,43,−87,−9,90,−25,−80,57}
{54,−85,−4,88,−46,−61,82,13,−90,38,67,−78,−22,90,−31,−73,73,31,−90,22,78,−67,−38,90,−13,−82,61,46,−88,4,85,−54}
{50,−89,18,75,−75,−18,89,−50,−50,89,−18,−75,75,18,−89,50,50,−89,18,75,−75,−18,89,−50,−50,89,−18,−75,75,18,−89,50}
{46,−90,38,54,−90,31,61,−88,22,67,−85,13,73,−82,4,78,−78,−4,82,−73,−13,85,−67,−22,88,−61,−31,90,−54,−38,90,−46}
{43,−90,57,25,−87,70,9,−80,80,−9,−70,87,−25,−57,90,−43,−43,90,−57,−25,87,−70,−9,80,−80,9,70,−87,25,57,−90,43}
{38,−88,73,−4,−67,90,−46,−31,85,−78,13,61,−90,54,22,−82,82,−22,−54,90,−61,−13,78,−85,31,46,−90,67,4,−73,88,−38}
{36,−83,83,−36,−36,83,−83,36,36,−83,83,−36,−36,83,−83,36,36,−83,83,−36,−36,83,−83,36,36,−83,83,−36,−36,83,−83,36}
{31,−78,90,−61,4,54,−88,82,−38,−22,73,−90,67,−13,−46,85,−85,46,13,−67,90,−73,22,38,−82,88,−54,−4,61,−90,78,−31}
{25,−70,90,−80,43,9,−57,87,−87,57,−9,−43,80,−90,70,−25,−25,70,−90,80,−43,−9,57,−87,87,−57,9,43,−80,90,−70,25}
{22,−61,85,−90,73,−38,−4,46,−78,90,−82,54,−13,−31,67,−88,88,−67,31,13,−54,82,−90,78,−46,4,38,−73,90,−85,61,−22}
{18,−50,75,−89,89,−75,50,−18,−18,50,−75,89,−89,75,−50,18,18,−50,75,−89,89,−75,50,−18,−18,50,−75,89,−89,75,−50,18}
{13,−38,61,−78,88,−90,85,−73,54,−31,4,22,−46,67,−82,90,−90,82,−67,46,−22,−4,31,−54,73,−85,90,−88,78,−61,38,−13}
{9,−25,43,−57,70,−80,87,−90,90,−87,80,−70,57,−43,25,−9,−9,25,−43,57,−70,80,−87,90,−90,87,−80,70,−57,43,−25,9}
{4,−13,22,−31,38,−46,54,−61,67,−73,78,−82,85,−88,90,−90,90,−88,85,−82,78,−73,67,−61,54,−46,38,−31,22,−13,4}

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110, which may be wired or wireless. Source device 102 and destination device 116 may comprise any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices. Likewise, additionally or alternatively, source device 102 and destination device 116 may be equipped for wired communication.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for coding AMT data. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for coding AMT data. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between video devices 102, 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM) or ITU-T H.266, also referred to as Versatile Video Coding (VVC). A recent draft of the VVC standard is described in Bross, et al. "Versatile Video Coding (Draft 5)," Joint Video Experts Team (WET) of ITU-T SG 16 WP 3 and ISO/IEC JTC 1/SC 29/WG 11, 14$^{th}$ Meeting: Geneva, CH, 19-27 Mar. 2019, JVET-N1001-v3 (hereinafter "VVC Draft 5"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM. According to JEM, a video coder (such as video encoder 200) partitions a picture into a plurality of coding tree units (CTUs). Video encoder 200 may partition a CTU according to a tree structure, such as a quadtree-binary tree (QTBT)

structure. The QTBT structure of JEM removes the concepts of multiple partition types, such as the separation between CUs, PUs, and TUs of HEVC. A QTBT structure of JEM includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In some examples, video encoder 200 and video decoder 300 may use a single QTBT structure to represent each of the luminance and chrominance components, while in other examples, video encoder 200 and video decoder 300 may use two or more QTBT structures, such as one QTBT structure for the luminance component and another QTBT structure for both chrominance components (or two QTBT structures for respective chrominance components).

Video encoder 200 and video decoder 300 may be configured to use quadtree partitioning per HEVC, QTBT partitioning according to JEM, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

JEM also provides an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. JEM provides sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
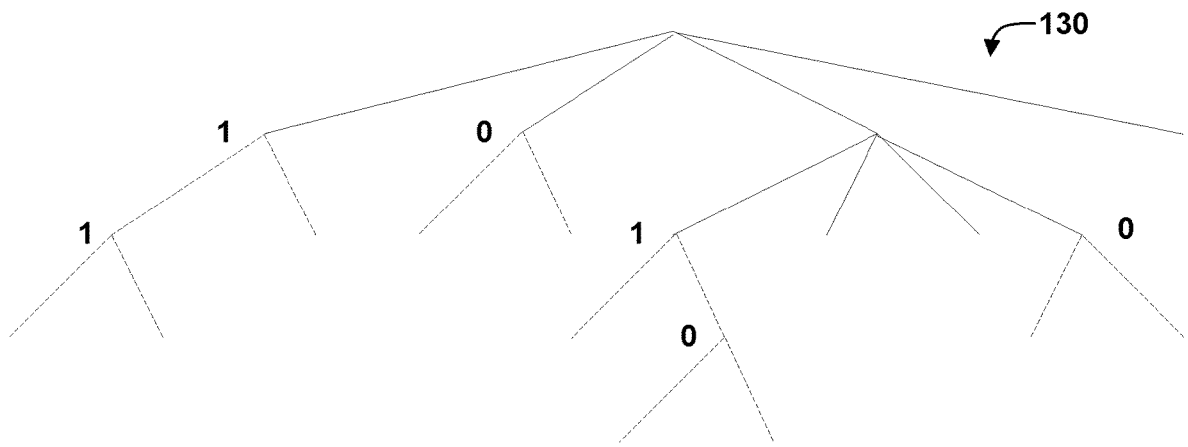
FIGS. 2A and 2B are conceptual diagrams illustrating an example quadtree binary tree (QTBT) structure, and a corresponding coding tree unit (CTU).
Figure 2B:
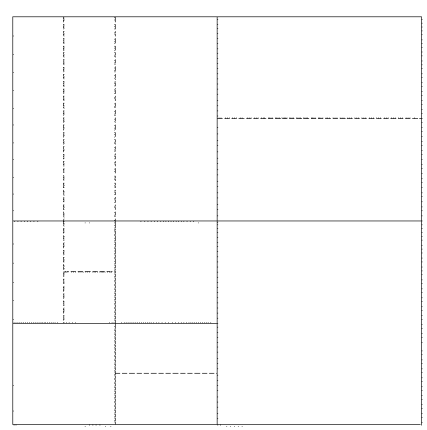

FIGS. 2A and 2B are conceptual diagram illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), they can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, it will not be further split by the binary tree, since the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

Figures 3A, 3B:
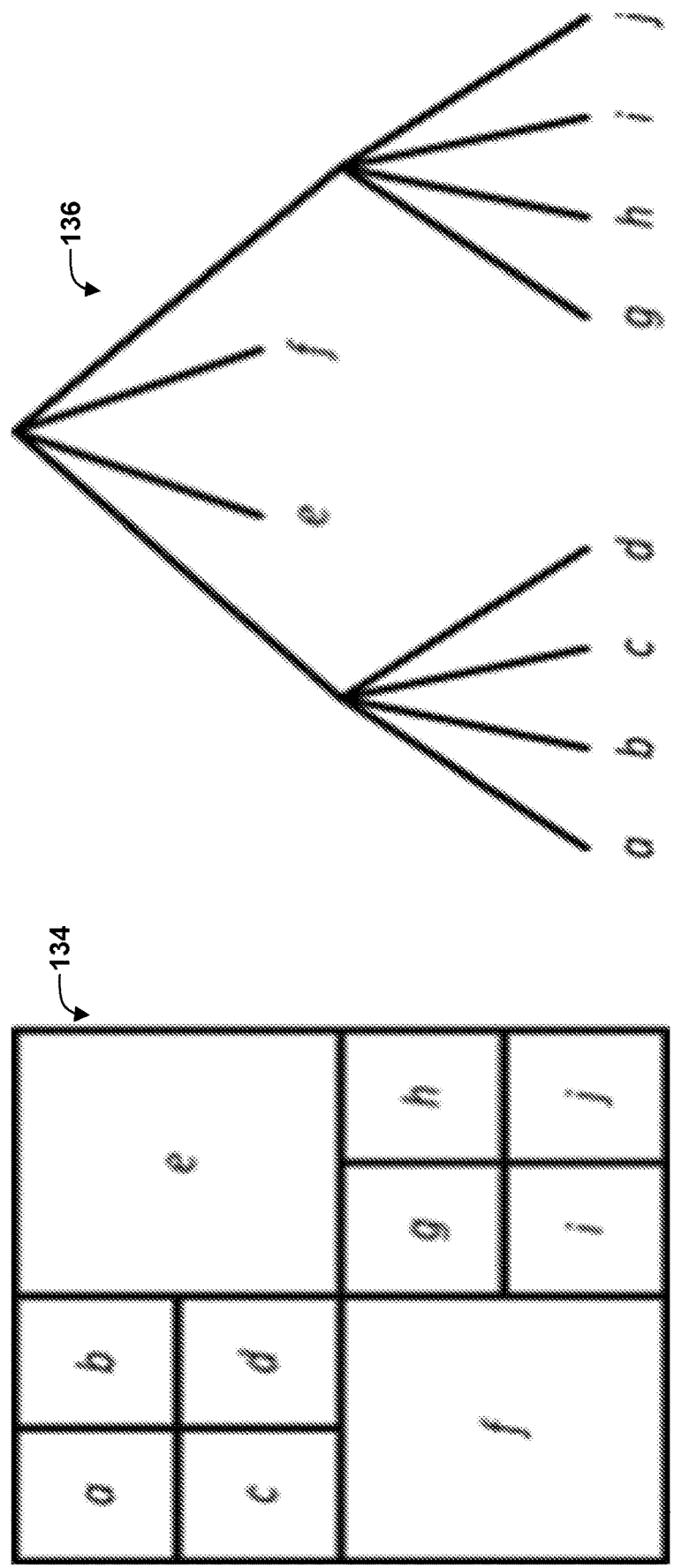
FIGS. 3A and 3B are conceptual diagrams illustrating an example transform scheme based on a residual quadtree of High Efficiency Video Coding (HEVC).

FIGS. 3A and 3B are conceptual diagrams illustrating an example transform scheme based on a residual quadtree of HEVC. In HEVC, a transform coding structure using the residual quadtree (RQT) is applied to adapt various characteristics of residual blocks, which is briefly described as follows, adapted from www.hhi.fraunhofer.de/fields-of-competence/image-processing/research-groups/image-video-coding/hevc-high-efficiency-video-coding/transform-coding-using-the-residual-quadtree-rqt.html.

In HEVC, each picture is divided into coding tree units (CTU), which are coded in raster scan order for a specific tile or slice. A CTU is a square block and represents the root of a quadtree, i.e., the coding tree. The CTU size may range from 8×8 to 64×64 luma samples, but typically 64×64 is used. Each CTU can be further split into smaller square blocks called coding units (CUs).

After the CTU is split recursively into CUs, each CU is further divided into prediction units (PU) and transform units (TU). The partitioning of a CU into TUs is carried out recursively based on a quadtree approach, therefore the residual signal of each CU is coded by a tree structure, namely the residual quadtree (RQT). The RQT allows TU sizes from 4×4 up to 32×32 luma samples.

FIG. 3A depicts an example where CU 134 includes 10 TUs, labeled with the letters a to j, and the corresponding block partitioning. Each node of RQT 136 shown in FIG. 3B is actually a transform unit (TU) corresponding to FIG. 3A. The individual TUs are processed in depth-first tree traversal order, which is illustrated in FIG. 3A as alphabetical order, which follows a recursive Z-scan with depth-first traversal. The quadtree approach enables the adaptation of the transform to the varying space-frequency characteristics of the residual signal.

Typically, larger transform block sizes, which have larger spatial support, provide better frequency resolution. However, smaller transform block sizes, which have smaller spatial support, provide better spatial resolution. The trade-off between the two, spatial and frequency resolutions, is chosen by the encoder mode decision, for example based on rate-distortion optimization technique. The rate-distortion optimization technique calculates a weighted sum of coding bits and reconstruction distortion, i.e., the rate-distortion cost, for each coding mode (e.g., a specific RQT splitting structure), and selects the coding mode with least rate-distortion cost as the best mode.

Three parameters are defined in the RQT per HEVC: the maximum depth of the tree, the minimum allowed transform size and the maximum allowed transform size. The minimum and maximum transform sizes can vary within the range from 4×4 to 32×32 samples, which correspond to the supported block transforms mentioned in the previous paragraph. The maximum allowed depth of the RQT restricts the number of TUs. A maximum depth equal to zero means that a CB cannot be split any further if each included TB reaches the maximum allowed transform size, e.g., 32×32.

All these parameters interact and influence the RQT structure in HEVC. Consider a case in which the root CB size is 64×64, the maximum depth is equal to zero, and the maximum transform size is equal to 32×32. In this case, the CB has to be partitioned at least once, since otherwise it would lead to a 64×64 TB, which is not allowed. The RQT parameters, i.e., maximum RQT depth, minimum and maximum transform size, are transmitted in the bitstream at the sequence parameter set level, per HEVC. Regarding the RQT depth, different values can be specified and signaled for intra and inter coded CUs.

The quadtree transform is applied for both Intra and Inter residual blocks in HEVC. Typically, the DCT-II transform of the same size of the current residual quadtree partition is applied for a residual block. However, if the current residual quadtree block is 4×4 and is generated by Intra prediction, the above 4×4 DST-VII transform is applied.

In HEVC, larger size transforms, e.g., 64×64 transform, are not adopted, mainly due to their limited benefit considering the relatively high complexity for relatively smaller resolution videos.

Figure 4:
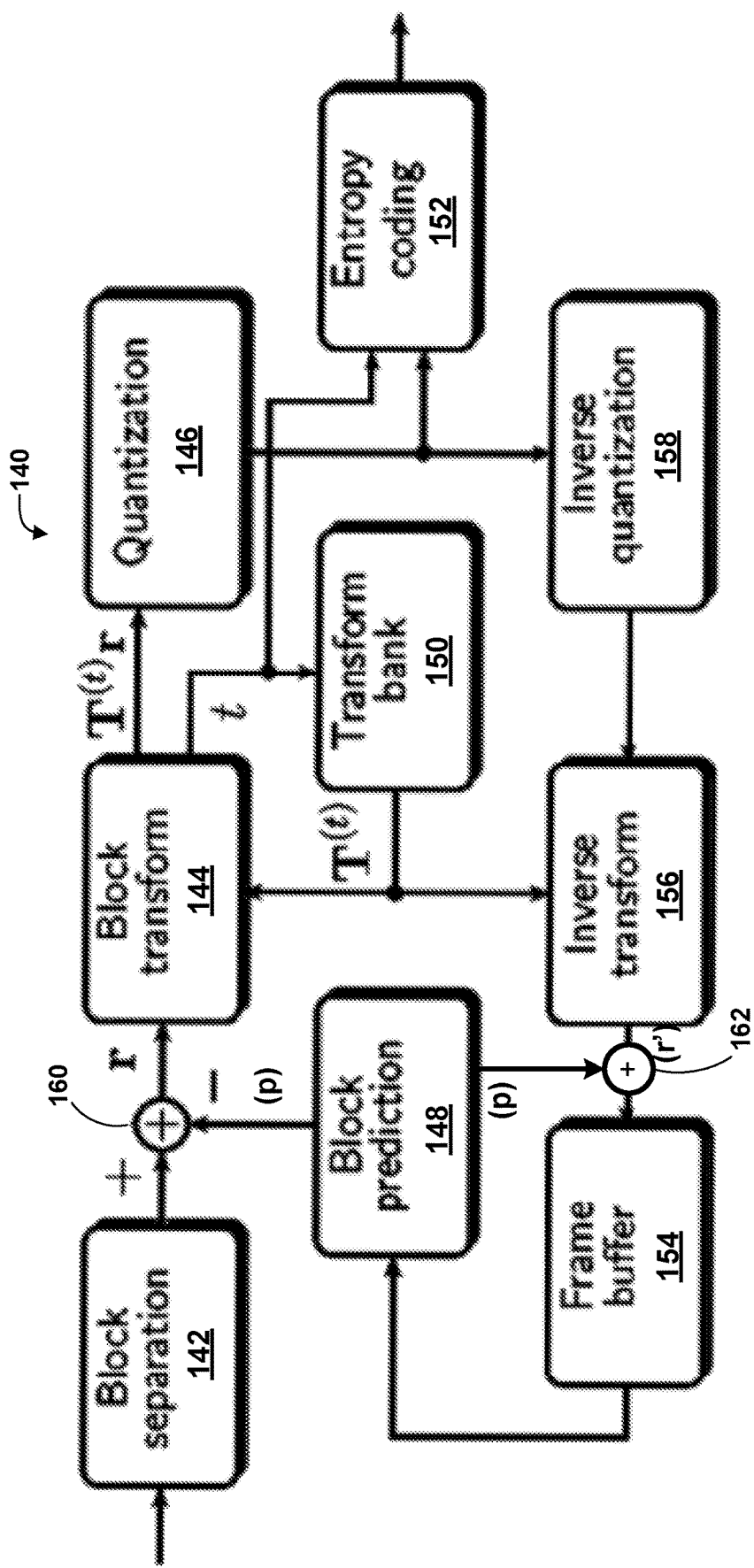
FIG. 4 is a block diagram illustrating an example system for hybrid video encoding with adaptive transform selection.

FIG. 4 is a block diagram illustrating an example system 140 for hybrid video encoding with adaptive transform selection. In this example, system 140 includes block separation unit 142, block transform unit 144, quantization unit 146, block prediction unit 148, transform bank 150, entropy coding unit 152, frame buffer 154, inverse transform unit 156, inverse quantization unit 158, residual generation unit 160, and block reproduction unit 162.

In general, block separation unit 142 produces blocks from a picture (i.e., a frame) of video data. Block prediction unit 148 generates a prediction block (p) for a current block, and residual generation unit 160 generates a residual block (r) from the current (uncoded) block and the prediction block (p). Frame buffer 154 (also referred to as a decoded picture buffer (DPB)) stores decoded data of the current picture and previously decoded frames, if any. Block prediction unit 148 may generate the prediction block from previously decoded data of one or more pictures stored in frame buffer 154.

Block transform unit 144 applies one or more transforms ($T^{(t)}$) to the residual block, including residual data in the spatial domain, to generate a transform block ($T^{(t)}r$) that represents the residual data in the frequency domain. The transform ($T^{(t)}$) may be, for example, a discrete cosine transform (DCT), a discrete sine transform (DST), horizontal and/or vertical transforms, Karhunen-Loeve transforms (KLTs), or any other such transform. Block transform unit 144 provides the transform block ($T^{(t)}r$) to quantization unit 146, and an indication of the transform (t) to transform bank 150 and entropy coding unit 152. Transform bank 150 provides one or more transform matrices to block transform unit 144 and inverse transform unit 156.

In accordance with the techniques of this disclosure, block transform unit 144 may apply a multiple transform scheme to a residual block. Similarly, inverse transform unit 156 may apply an inverse multiple transform scheme to a transform block. The multiple transform (or inverse multiple transform) scheme may include a primary transform and a secondary transform, such as a rotational transform. Additionally or alternatively, the multiple transform (or inverse multiple transform) scheme may represent both a horizontal transform and a vertical transform. More generally, the multiple transform (or inverse multiple transform) scheme may represent any combination of separable and/or non-separable transforms.

Quantization unit 146 quantizes transform coefficients of the transform block and provides the quantized transform block to entropy coding unit 152 and inverse quantization unit 158. Entropy coding unit 152 encodes syntax elements representing, for example, the transform indication (t), the quantized transform coefficients, prediction information (e.g., a prediction mode and corresponding information, such as a location of reference data to be used in the prediction mode, e.g., motion information for inter-prediction). Entropy coding unit 152 may use the techniques of this disclosure to entropy encode the transform indication (t) using a truncated unary codeword. That is, one truncated unary codeword may represent the multiple transform (MT) scheme, e.g., both a primary transform and a secondary transform, both a horizontal transform and a vertical transform, and/or any combination of separable and/or non-separable transforms.

Inverse quantization unit 158 may inverse quantize (i.e., dequantize) the quantized transform coefficients received from quantization unit 146. Inverse transform unit 156 may apply the inverse multiple transform scheme to the transform coefficients received from inverse quantization unit 158 to reproduce the residual block (r') for the current block. Block reproduction unit 162 further combines the prediction block (p) from block prediction unit 148 with the reproduced residual block (r') to form a decoded block, which is stored in frame buffer 154.

The techniques of this disclosure may be performed by system 140, or a corresponding decoding system. In general, the techniques of this disclosure are applicable to an adaptive transform coding scheme, where for each block of prediction residuals, different transforms can be selected by a video encoder, signaled as side information, and determined by a video decoder using the side information.

Figure 5B:
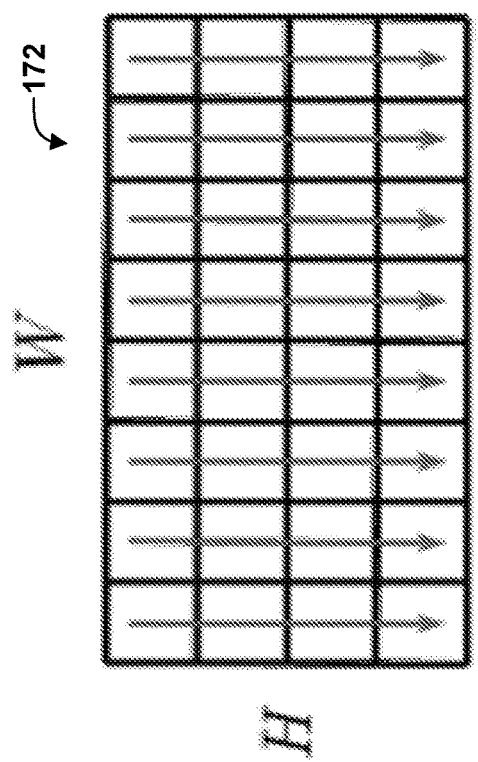
FIGS. 5A and 5B are conceptual diagrams illustrating horizontal and vertical transforms as a separate transform implementation.
Figure 5A:
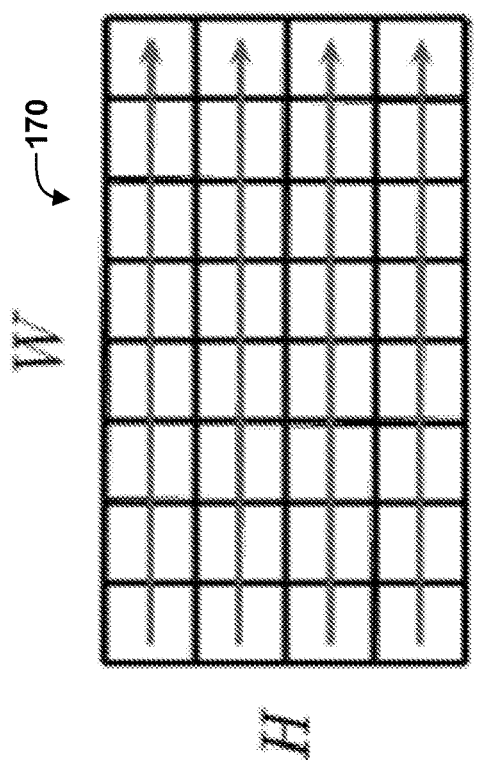

FIGS. 5A and 5B are conceptual diagrams illustrating horizontal and vertical transforms as a separate transform implementation. FIG. 5A represents a set of H horizontal transforms 170, while FIG. 5B represents a set of W vertical transforms 172. In particular, horizontal and vertical lines of residual values may be transformed independently using the horizontal transforms 170 and vertical transforms 172, respectively.

In video coding standards prior to HEVC, only a fixed separable transform is used, where DCT-2 is used both vertically and horizontally. In HEVC, in addition to DCT-2, DST-7 is also employed for 4×4 blocks as a fixed separable transform. U.S. patent application Ser. Nos. 15/005,736 and 15/649,612 cover adaptive extensions of those fixed transforms, and an example of AMT has been adopted in the Joint Experimental Model (JEM) of the Joint Video Experts Team (WET).

Figure 6:
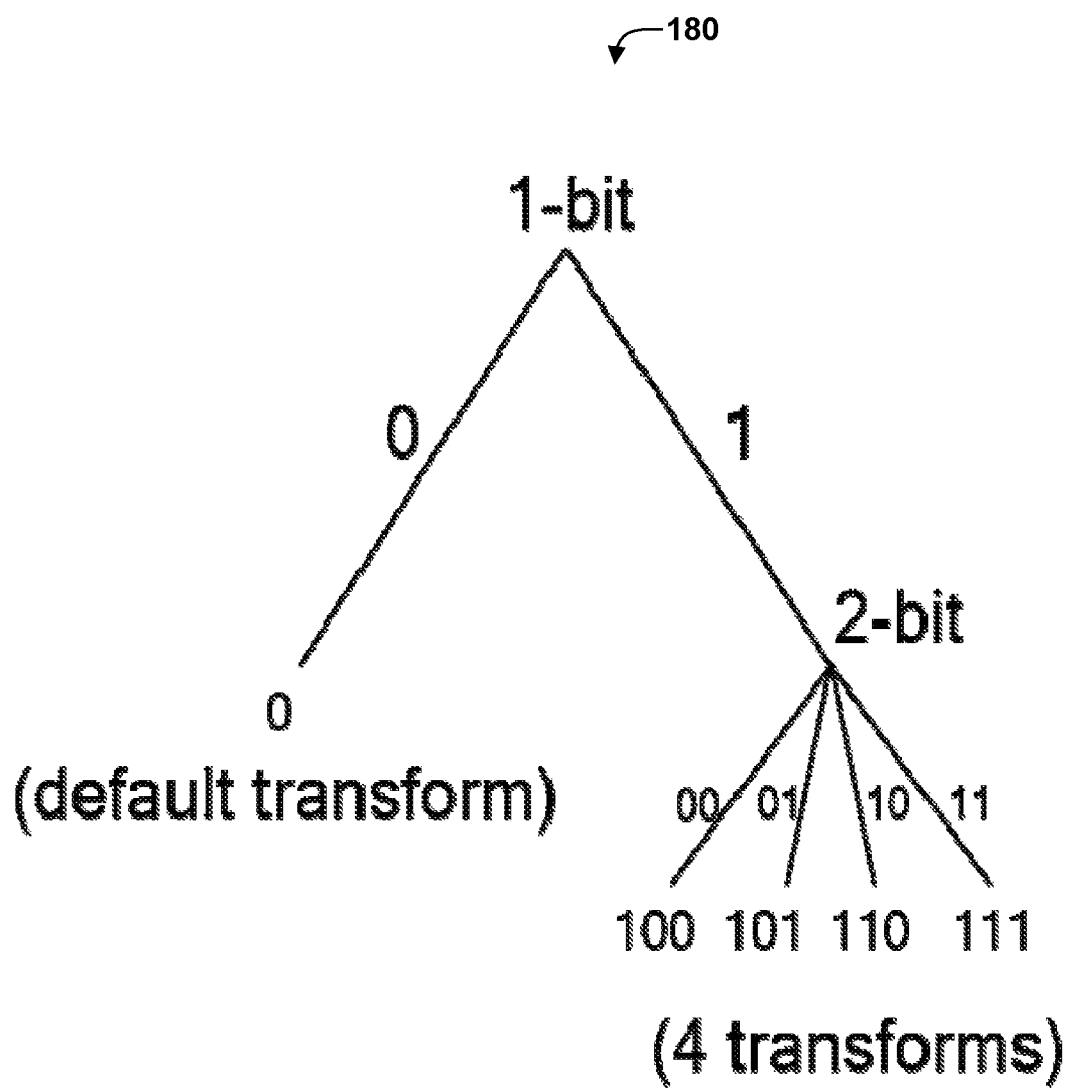
FIG. 6 is a conceptual diagram illustrating an example technique for signaling transforms.

FIG. 6 is a conceptual diagram illustrating an example technique for signaling transforms. In particular, FIG. 6 represents an example set of codewords 180 according to the techniques described in U.S. patent application Ser. Nos. 15/005,736 and 15/649,612. The AMT designs described in U.S. patent application Ser. Nos. 15/005,736 and 15/649,612 offer 5 transform options for an encoder to select on a per-block basis (this selection is generally done based on a rate-distortion metric). Then, the selected transform index is signaled to the decoder.

FIG. 6 illustrates the signaling proposed in U.S. patent application Ser. Nos. 15/005,736 and 15/649,612, where 1-bit is used to signal the default transform and 2 additional bits (i.e., 3 bits in total) are used to signal one of a set of four other transforms. In U.S. patent application Ser. Nos. 15/005,736 and 15/649,612, the default transform is selected as the separable 2-D DCT, which applies DCT-2 both vertically and horizontally. The rest of the AMTs are defined based on intra-mode information in U.S. patent application Ser. No. 15/005,736. U.S. patent application Ser. No. 15/649,612 proposes an extension of U.S. patent application Ser. No. 15/005,736 by defining the set of those four transforms based on both prediction mode and block size information. In particular, in the example of FIG. 6, out of five transforms, one of the transforms (default transform) is signaled using 0 (i.e., one bit), and the other four transforms are signaled using three bits (i.e., 100, 101, 110, and 111).

The signaling overhead of AMT designs in U.S. patent application Ser. Nos. 15/005,736 and 15/649,612 may be reduced, since 3 bits are signaled to identify one among four transforms for each block. As a result, the coding efficiency may degrade, despite having four transform options, since the signaling overhead may not result in a good rate-distortion tradeoff. In order to reduce the 3-bit signaling overhead in U.S. patent application Ser. Nos. 15/005,736 and 15/649,612, this disclosure describes techniques for using a fewer number of transforms with less signaling overhead. For example, the techniques of this disclosure may include using a one-bit or two-bit signaling for five possible transforms. Additionally or alternatively, truncated unary codewords may be defined for each possible transform. With this approach, the proposed designs also reduce the complexity of searching more transforms at the encoder side as compared to the techniques of U.S. patent application Ser. Nos. 15/005,736 and 15/649,612.

Figure 7:
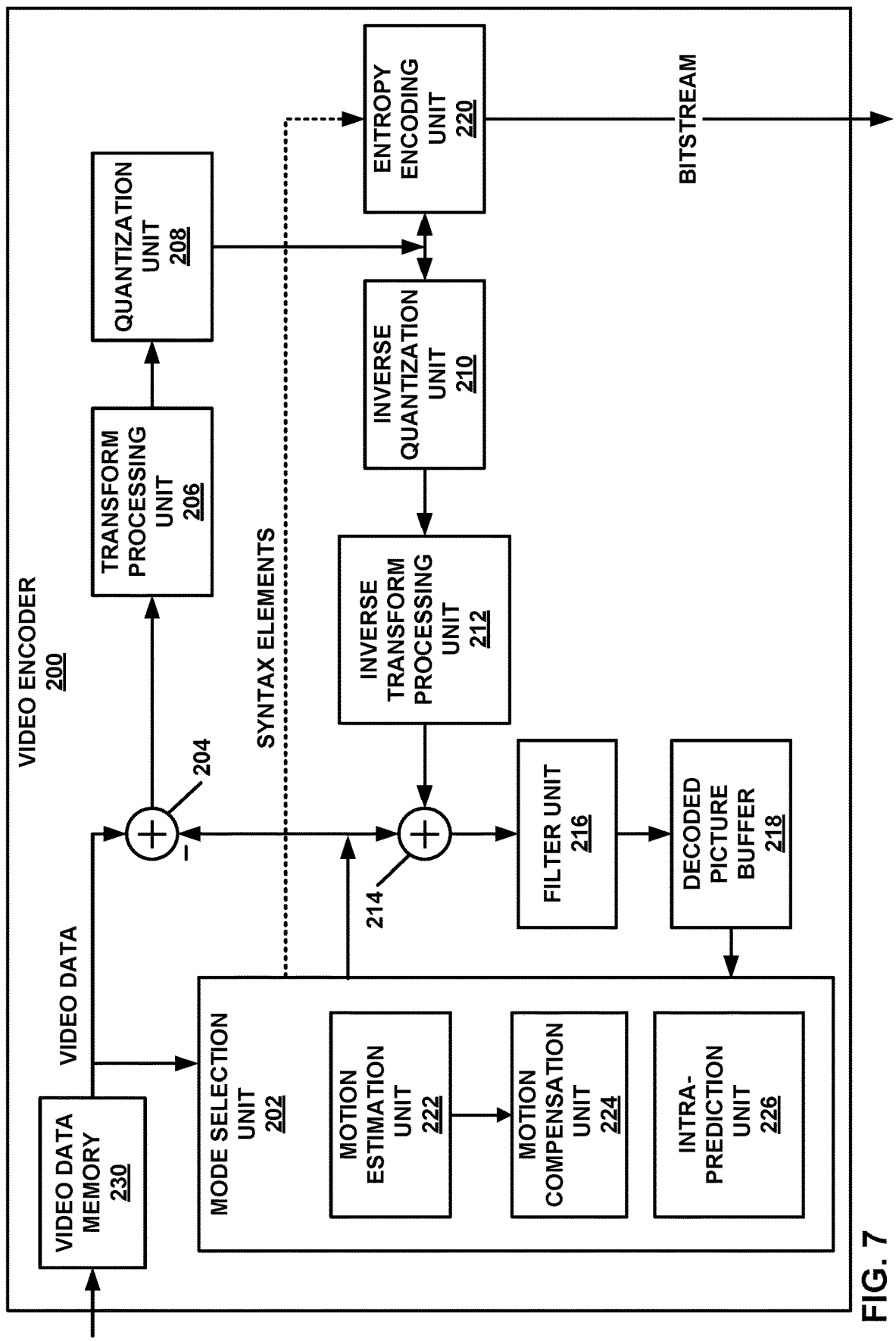
FIG. 7 is a block diagram illustrating an example video encoder that may perform the techniques of this disclosure.

FIG. 7 is a block diagram illustrating an example video encoder 200 that may perform the techniques of this disclosure. FIG. 7 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 7, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. FIG. 7 may further include a transform bank from which transform processing unit 206 and inverse transform processing unit 212 select transforms according to the techniques of this disclosure, as shown in FIG. 4 above. Likewise, as shown in FIG. 4, transform processing unit 206 may provide an indication of a selected transform to entropy encoding unit 220, which may encode data according to the techniques of this disclosure representing which of a variety of transforms for an AMT scheme is selected for a current block of video data.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 7 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms on a residual block, e.g., a primary transform and a secondary transform, such as a rotational transform, or a horizontal transform and a vertical transform. In some examples, transform processing unit 206 does not apply transforms to a residual block.

In accordance with the techniques of this disclosure, transform processing unit 206 may apply multiple transforms of a multiple transform (MT) scheme to a residual block for a current block. The MT scheme may define, for example, a primary transform and a secondary transform to be applied to the residual block. Additionally or alternatively, the MT scheme may define a horizontal transform and a vertical transform, such as those shown in FIGS. 5A and 5B as discussed above. In any case, transform processing unit 206 may apply each transform of the MT scheme to the residual block to generate transform coefficients of a transform coefficient block.

Quantization unit 208 may quantize the transform coefficients in the transform coefficient block, to produce a quantized transform coefficient block. Quantization unit 208 may quantize transform coefficients of the transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

In accordance with the techniques of this disclosure, entropy encoding unit 220 may entropy encode a truncated unary codeword representing a multiple transform (MT) scheme, where the MT scheme may include two or more transforms. For example, the MT scheme may include a primary transform and a secondary transform, such as a rotational transform. Additionally or alternatively, the MT scheme may include a horizontal transform and a vertical transform, where the vertical transform may be a different type of transform. For example, the horizontal transform may be based on a DCT and the vertical transform may be based on a DST, or vice versa. Likewise, different types of DCTs and DSTs may be used in various MT schemes. Video encoder 200 may include a variety of MT schemes, each of which may include two or more transforms, and entropy encoding unit 220 may be configured to encode one truncated unary codeword per MT scheme. In this manner, each truncated unary codeword may represent a plurality of transforms for a corresponding MT scheme. Entropy encoding unit 220 may select a context for entropy encoding the truncated unary codeword using side information such as, for example, block size, block type (luma or chroma), prediction mode, and/or any other side information from neighboring blocks. In some examples, a table (with entries specified using any side information) may be employed to define the entropy coding context.

Video encoder 200 may output a bitstream that includes the entropy encoded syntax elements needed to reconstruct blocks of a slice or picture. In particular, entropy encoding unit 220 may output the bitstream including, for example, entropy encoded data representative of a truncated unary codeword for a MT scheme of a current block, assuming multiple transforms are applied to the current block, according to the techniques of this disclosure.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device for encoding video data including a memory configured to store video data; and a processor implemented in circuitry and configured to: apply a multiple transform (MT) scheme to residual data for a current block of the video data to generate a block of transform coefficients; encode a truncated unary codeword representing the MT scheme for the current block; and encode the current block using the block of transform coefficients.

Figure 8:
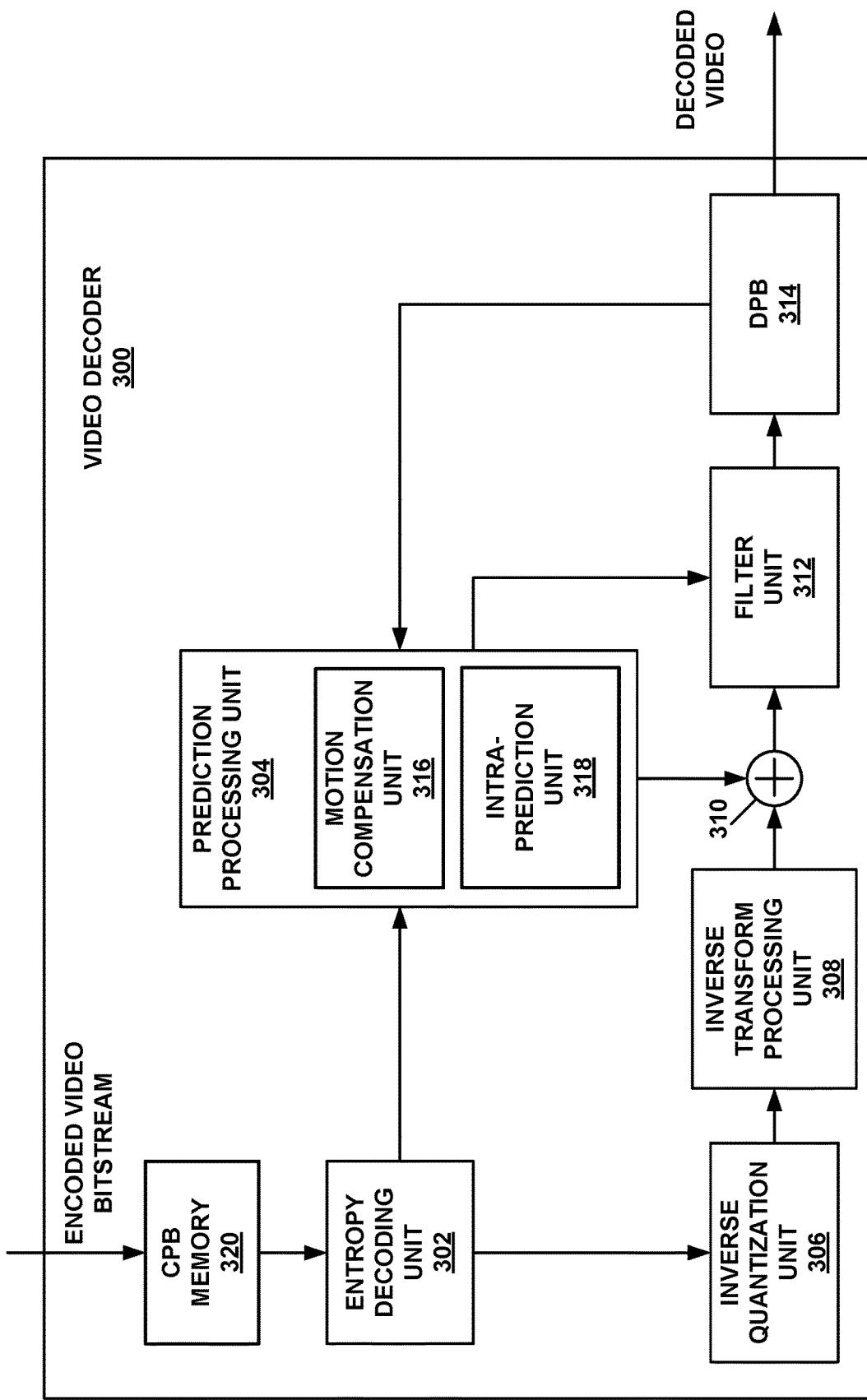
FIG. 8 is a block diagram illustrating an example video decoder that may perform the techniques of this disclosure.

FIG. 8 is a block diagram illustrating an example video decoder 300 that may perform the techniques of this disclosure. FIG. 8 is provided for purposes of explanation and is not limiting on the techniques as broadly exemplified and described in this disclosure. For purposes of explanation, this disclosure describes video decoder 300 according to the techniques of JEM and HEVC. However, the techniques of this disclosure may be performed by video coding devices that are configured to other video coding standards.

In the example of FIG. 8, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. FIG. 8 may further include a transform bank from which inverse transform processing unit 308 select transforms according to the techniques of this disclosure, as shown in FIG. 4 above. Likewise, reciprocal to the techniques shown in FIG. 4, entropy decoding unit 302 may decode data according to the techniques of this disclosure representing which of a variety of transforms for an AMT scheme is selected for a current block of video data and provide an indication of the transform to inverse transform processing unit 308.

Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 8 are illustrated to assist with understanding the operations performed by video decoder 300. The units may be implemented as fixed-function circuits, programmable circuits, or a combination thereof. Similar to FIG. 7, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

In accordance with the techniques of this disclosure, entropy decoding unit 302 may decode a truncated unary codeword representing a multiple transform (MT) scheme for a current block of data being decoded. The truncated unary codeword may correspond to one MT scheme of a number of various MT schemes, and each of the MT schemes may include multiple inverse transforms. For example, the inverse transforms may be inverse DCTs, DSTs, KLTs, horizontal transforms, vertical transforms, identity transforms, separable transforms, and/or non-separable transforms, in any combination. Entropy decoding unit 302 may select a context for entropy decoding the truncated unary codeword using side information such as, for example, block size, block type (luma or chroma), prediction mode, and/or any other side information from neighboring blocks. In some examples, a table (with entries specified using any side information) may be employed to define the entropy coding context. In this manner, entropy decoding unit 302 may decode one truncated unary codeword representing multiple inverse transforms of the MT scheme to which the truncated unary codeword corresponds. Likewise, entropy decoding unit 302 represents an example of means for decoding a truncated unary codeword representing a multiple transform (MT) scheme for a current block of video data to determine the MT scheme.

Entropy decoding unit 302 may provide the codeword to, e.g., inverse transform processing unit 308. Thus, after inverse quantization unit 306 forms the transform coefficient block, inverse transform processing unit 308 may apply the one or more inverse transforms corresponding to the truncated unary codeword to the transform coefficient block to generate a residual block associated with the current block. Thus, inverse transform processing unit 308 represents an example of means for applying the MT scheme to transform coefficients of the current block to produce residual data for the current block of video data.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 7).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 7). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block. As such, reconstruction unit 310, along with other components of video decoder 300 of FIG. 8, represent examples of means for decoding a current block using residual data.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not needed, reconstruction unit 310 may store reconstructed blocks to DPB 314. In examples where operations of filter unit 312 are needed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB 314 for subsequent presentation on a display device, such as display device 118 of FIG. 1.

Video decoder 300 represents an example of a video decoding device including a memory configured to store video data, and one or more processing units implemented in circuitry and configured to decode a truncated unary codeword representing a multiple transform (MT) scheme for a current block of the video data to determine the MT scheme; apply the MT scheme to transform coefficients of the current block to produce residual data for the current block of video data; and decode the current block using the residual data.

Video encoder 200 and/or video decoder 300 may be configured according to the techniques of this disclosure, as discussed above. In particular, an AMT scheme according to this disclosure may be defined by assigning transforms to codewords of a specified signaling method. So, an AMT is completely defined by specifying: (i) a single set or multiple sets of transforms, and (ii) a signaling method.

FIGS. 9A-9E are conceptual diagrams illustrating example signaling techniques for various AMT schemes in accordance with the techniques of this disclosure. The AMT designs of this disclosure may be defined based on one or more of the signaling methods shown in FIGS. 9A-9E.

Figure 9A:
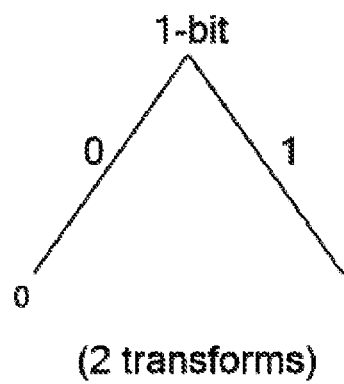
FIGS. 9A-9E are conceptual diagrams illustrating example signaling techniques for various multiple transform (MT) schemes in accordance with the techniques of this disclosure.
Figure 9B:
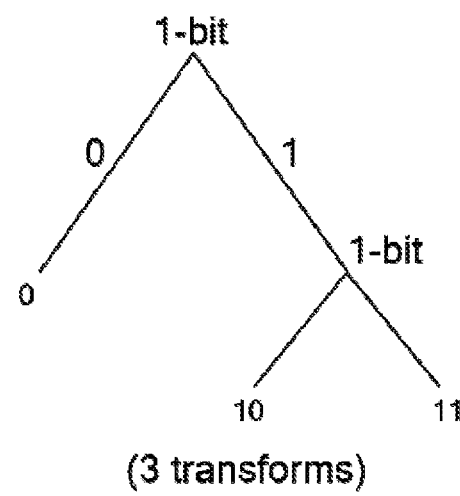
Figure 9C:
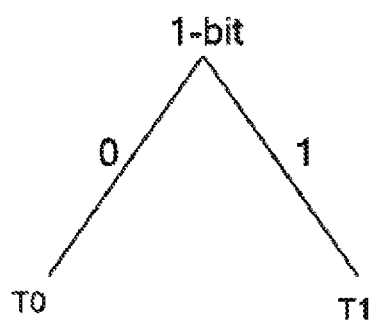

In one example, one-bit (e.g., a 0/1 Boolean flag) may be used to identify/signal one transform from a pre-defined set of two transforms, e.g., as shown in FIG. 9A. That is, FIG. 9A illustrates an example AMT signaling used to identify two transforms. FIG. 9C illustrates an example assignment of two transforms (T0, T1) for the signaling method of FIG. 9A.

Figure 9D:
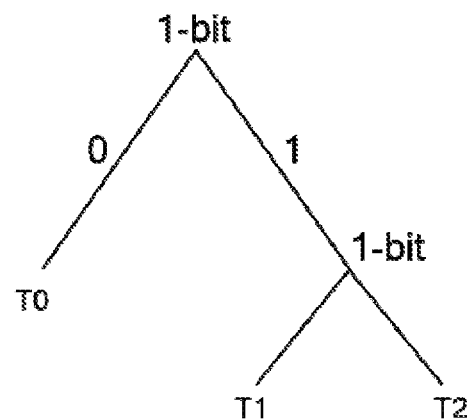

In another example, one or two bits are used to identify/signal one transform from a pre-defined set of three transforms. Specifically, in one example, the following three binary codewords are used for signaling: "0," "10," and "11." FIG. 9B illustrates an example of AMT signaling used to identify three transforms. FIG. 9D illustrates an example assignment of three transforms (T0, T1, T2) for the signaling method of FIG. 9B. The example of FIG. 9B represents an example of truncated unary codewords for three transforms. Furthermore, the example of FIG. 9B can be extended to construct codewords for N transforms, each having a respective truncated unary codeword. Such codewords may be $1^{i-1}0$ for codeword i in the set of codewords $i \in \{1, N-1\}$, and $1^N$ for codeword N. The notation "$1^K 0$" represents a sequence of K 1's followed by 0. So, for example, for a set of six transforms, the truncated unary codewords may be 0, 10, 110, 1110, and 11111. Alternatively, the values of 1 and 0 may be swapped, e.g., for N transforms, the codewords may be $0^{i-1}1$ for codeword i in the set of codewords $i \in \{1, N-1\}$, and $0^N$ for codeword N.

Figure 9E:
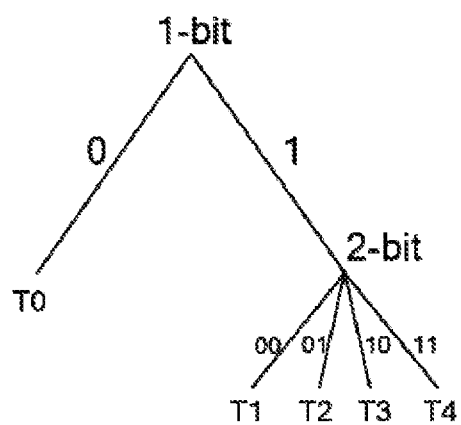

In yet another example, FIG. 9E illustrates an example assignment of five transforms according to the signaling method of FIG. 6.

A signaling method and the entropy coding of the corresponding bins of data for representing a transform may depend on side information such as block size, block type (luma or chroma), prediction mode, and/or any other side information from neighboring blocks. For example, a table (with entries specified using any side information) may be employed to define the entropy coding context.

Combinations of the signaling methods proposed in this disclosure and U.S. patent application Ser. Nos. 15/005,736 and 15/649,612 can be used to design more sophisticated signaling schemes. Such designs may also be block size and prediction mode dependent. As a specific example, for larger blocks the methods in U.S. patent application Ser. Nos. 15/005,736 and 15/649,612 can be used, and for small blocks the methods presented in this disclosure can be used. That is, the techniques of this disclosure may be applied when a size of a current block is less than a threshold size; otherwise, the techniques of U.S. patent application Ser. Nos. 15/005,736 and 15/649,612 may be used instead.

In the AMT scheme, for any signaling method, including those depicted in FIGS. 6, 9A, and 9B, a set of transforms may be assigned to corresponding codewords, as shown in FIGS. 9C, 9D, and 9E. A transform set may satisfy one or more of the following properties:

A set of transforms may include separable and/or non-separable block transforms.

A set of transforms may only include separable transforms. For example, a separable transform can be derived based on a pair of transforms selected from a type of DCT and DSTs.

A set of transforms may be defined based on any side information, such as block size and prediction mode.

The set of transforms may be used for all block and prediction mode combinations. For example, together with the separable DCT-2, additional separable transforms derived from DCT-8 and DST-7 can be used. For example, in FIG. 9E, T0 can be the 2-D DCT (derived from DCT-2 applied horizontally and vertically). The rest of the four transforms in FIG. 9E (from T1 to T4) can be defined using combinations of DCT-8 and DST-7 applied horizontally and vertically. As another example, in FIG. 9A, T0 can be 2-D DCT (derived from DCT-2 applied horizontally and vertically), and T1 can be the separable transform that applies DST 7 both horizontally and vertically.

For rectangular luma or chroma blocks, DST-7 or DST-4 can be applied to one side of the block, and for the other side identity transform can be applied. For example, $T_h$ can be DST-7 and $T_v$ can be the identity transform or vice versa.

Figure 10:
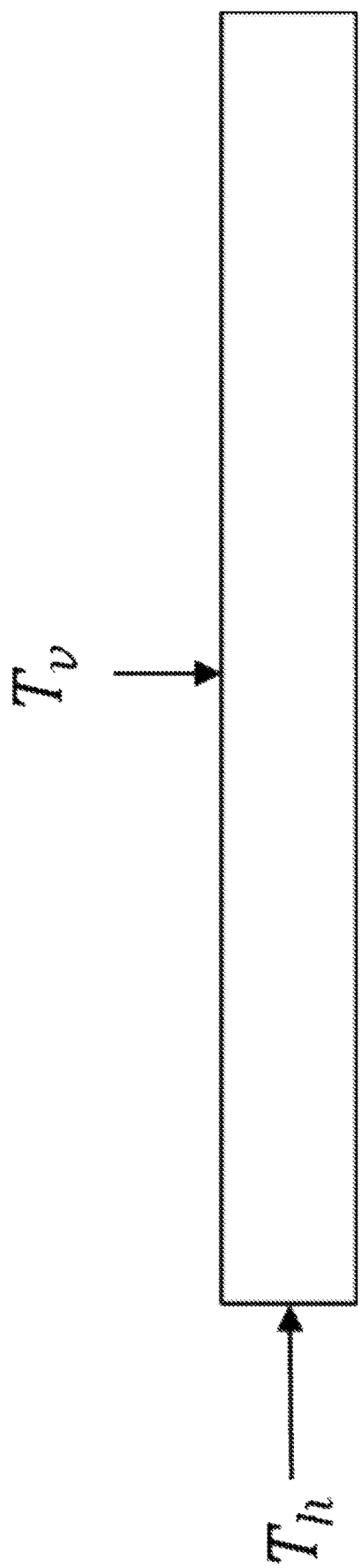
FIG. 10 is a conceptual diagram illustrating separable transforms applied to a rectangular block using two one-dimensional transforms.

FIG. 10 is a conceptual diagram illustrating separable transforms applied to a rectangular block using two one-dimensional transforms. In particular, the one-dimensional transforms include $T_h$ (horizontal) and $T_v$ (vertical).

Under certain conditions, the transform signaling process may be skipped and a pre-defined fixed transform (e.g., DST-7, DCT-2 or identity transform), which does not require any signaling, may be applied. Such certain conditions can be defined based on any side information available at encoder/decoder such as the following. For example, video encoder 200 may skip the signaling of a transform if a number of nonzero coefficients after performing the transform is less than a certain threshold. As another example, video decoder 300 may derive the transform based on the number of non-zero transform coefficients if the number of non-zero transform coefficients is less than the threshold.

A transform skip (which is equivalent to applying the identity transform both vertically and horizontally) can be applied for small blocks. As a specific example, transform may be skipped for 2×2 chroma blocks.

Figure 11:
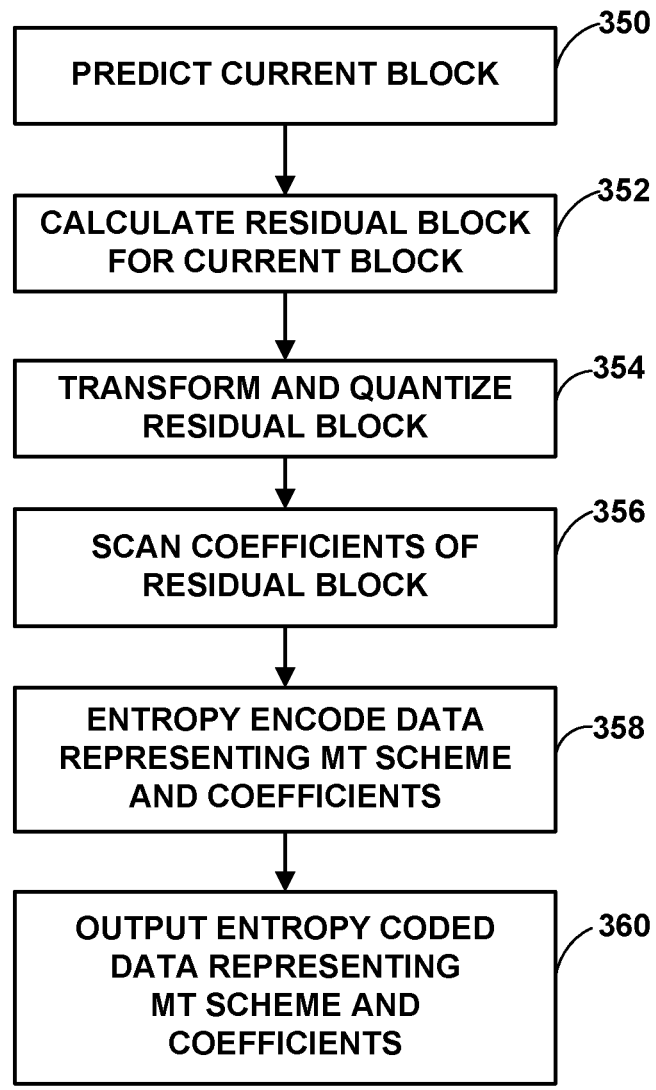
FIG. 11 is a flowchart illustrating an example method for encoding a current block according to the techniques of this disclosure.

FIG. 11 is a flowchart illustrating an example method for encoding a current block according to the techniques of this disclosure. The current block may comprise a current CU. Although described with respect to video encoder 200 (FIGS. 1 and 7), it should be understood that other devices may be configured to perform a method similar to that of FIG. 11.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, uncoded block and the prediction block for the current block. Video encoder 200 may then select a multiple transform (MT) scheme and transform the residual block using the MT scheme, and quantize resulting transform coefficients (354). Next, video encoder 200 may scan the quantized transform coefficients of the residual block (356). During the scan, or following the scan, video encoder 200 may entropy encode the coefficients, as well as data representing the selected MT scheme (358). For example, video encoder 200 may entropy encode a truncated unary codeword representing the MT scheme using any of the various techniques of this disclosure as discussed above. Video encoder 200 may encode the coefficients using CAVLC or CABAC. Video encoder 200 may then output the entropy coded data representing the MT scheme and coefficients of the current block (360).

In this manner, the method of FIG. 11 represents an example of a method of encoding video data, the method including applying a multiple transform (MT) scheme to residual data for a current block of video data to generate a block of transform coefficients; encoding a truncated unary codeword representing the MT scheme for the current block; and encoding the current block using the block of transform coefficients.

Figure 12:
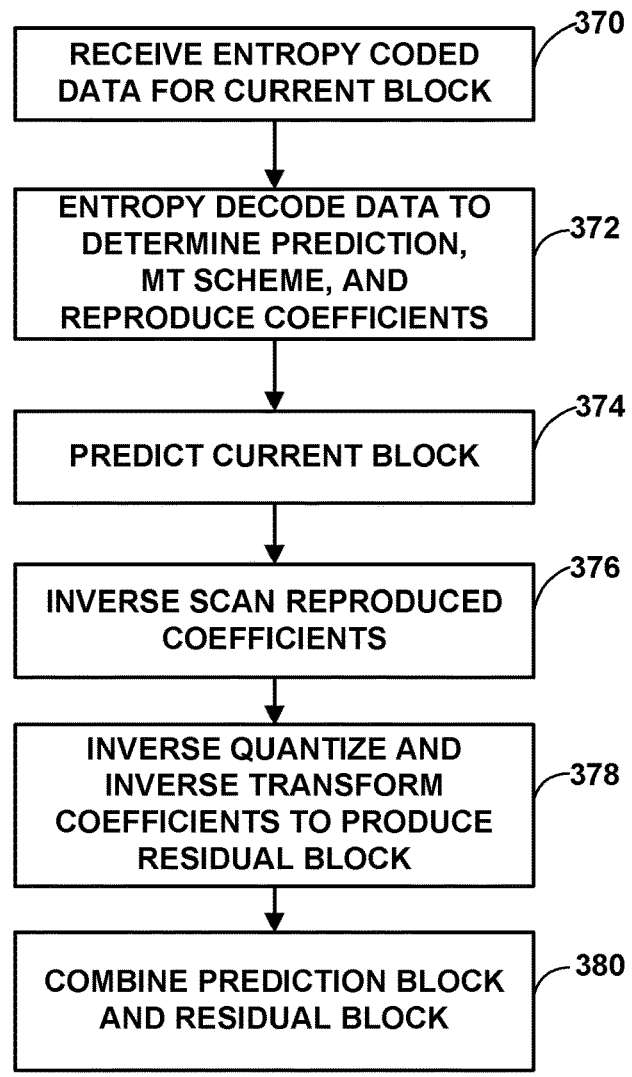
FIG. 12 is a flowchart illustrating an example method for decoding a current block of video data according to the techniques of this disclosure.

FIG. 12 is a flowchart illustrating an example method for decoding a current block of video data according to the techniques of this disclosure. The current block may comprise a current CU. Although described with respect to video decoder 300 (FIGS. 1 and 8), it should be understood that other devices may be configured to perform a method similar to that of FIG. 12.

Video decoder 300 may receive entropy coded data for the current block, such as entropy coded prediction information and entropy coded data for coefficients of a residual block corresponding to the current block (370). Video decoder 300 may entropy decode the entropy coded data to determine prediction information for the current block, a multiple transform (MT) scheme for the current block, and to reproduce coefficients of the residual block (372). In particular, in accordance with the techniques of this disclosure, video decoder 300 may entropy decode a truncated unary codeword representative of the MT scheme. Video decoder 300 may entropy decode the MT scheme information according to any of the various techniques of this disclosure. Video decoder 300 may predict the current block (374), e.g., using an intra- or inter-prediction mode as indicated by the prediction information for the current block, to calculate a prediction block for the current block. Video decoder 300 may then inverse scan the reproduced coefficients (376), to create a block of quantized transform coefficients. Video decoder 300 may then inverse quantize and inverse transform the coefficients using the indicated MT scheme to produce a residual block (378). Video decoder 300 may ultimately decode the current block by combining the prediction block and the residual block (380).

In this manner, the method of FIG. 12 represents an example of a method of decoding video data, the method including decoding a truncated unary codeword representing a multiple transform (MT) scheme for a current block of video data to determine the MT scheme; applying the MT scheme to transform coefficients of the current block to produce residual data for the current block of video data; and decoding the current block using the residual data.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    determining a signaling method for a current block of video data from a plurality of signaling methods, the signaling methods comprising:
        a first signaling method specifying a first mapping between a truncated unary codeword and a multiple transform (MT) scheme; and
        a second signaling method specifying a second mapping from side information for
    the current block to a second transform scheme,
    wherein determining the signaling method comprises determining the first signaling method for the current block;
    decoding the truncated unary codeword representing the MT scheme for the current block of the video data;
    determining the MT scheme for the current block as being the MT scheme to which the determined signaling method maps the truncated unary codeword;
    applying the MT scheme to transform coefficients of the current block to produce residual data for the current block of the video data; and
    decoding the current block using the residual data.

2. The method of claim 1, wherein the plurality of signaling methods comprise a third signaling method using a one-bit flag to represent one of two transforms of a predefined set of two transforms, and a fourth signaling method using a set of one- or two-bit flags to represent one of three transforms of a predefined set of three transforms, the first signaling method comprising one of the third signaling method or the fourth signaling method, and the MT scheme comprising the one of the two transforms of the predefined set of two transforms or the one of the three transforms of the predefined set of three transforms.

3. The method of claim 2,
    wherein when the determined signaling method comprises the first signaling method using the one-bit flag, the truncated unary codeword representing the MT scheme comprises one of a value of "0" or "1," and
    wherein when the determined signaling method comprises the second signaling method using the one- or two-bit flags, the truncated unary codeword representing the MT scheme comprises one of "0," "10," or "11."

4. The method of claim 1, wherein decoding the truncated unary codeword comprises entropy decoding the truncated unary codeword using context information determined from one or more of a size of the current block, a type for the current block, a prediction mode for the current block, or data for one or more neighboring blocks to the current block.

5. The method of claim 4, wherein the type for the current block comprises one of a luminance block or a chrominance block.

6. The method of claim 1, further comprising determining that a size of the current block is less than a threshold size, wherein decoding the truncated unary codeword representing the MT scheme comprises decoding the truncated unary codeword representing the MT scheme in response to the size of the current block being less than the threshold size.

7. The method of claim 1, the current block comprising a first block, the method further comprising:
    determining that a size of a second block, different than the first block, is greater than a threshold size;
    in response to determining that the size of the second block is greater than the threshold size:
        decoding a first bit representing whether the second block is to be inverse transformed using a default inverse transform;
        in response to the first bit indicating that the second block is to be inverse transformed using the default inverse transform, inverse transforming transform coefficients for the second block using the default inverse transform to produce a residual block for the second block; and
        in response to the first bit indicating that the second block is not to be inverse transformed using the default inverse transform, decoding two bits indicating one of a set of four other inverse transforms and inverse transforming the transform coefficients for the second block using the one of the set of four other inverse transforms indicated by the decoded two bits.

8. The method of claim 1, wherein the MT scheme comprises a set of transforms of a plurality of sets of transforms, each of the sets of transforms including a respective plurality of transforms, and wherein applying the MT scheme comprises performing each of the plurality of transforms of the set of transforms.

9. The method of claim 8, the set of transforms comprising any combination of separable transforms or non-separable transforms.

10. The method of claim 8, further comprising determining the plurality of sets of transforms according to side information including one or more of a size of the current block or a prediction mode of the current block.

11. The method of claim 1, wherein the MT scheme comprises a horizontal transform and a vertical transform, the vertical transform being different than the horizontal transform.

12. The method of claim 11, wherein one of the horizontal transform or the vertical transform comprises an identity transform.

13. The method of claim 1, wherein the current block comprises a first block, the method further comprising skipping coding of a truncated unary codeword representing an MT scheme for a second block based on side information for the second block.

14. The method of claim 13, wherein the side information comprises a number of non-zero transform coefficients for the second block being less than a threshold value, the method further comprising determining that a number of non-zero transform coefficients for the first block is greater than or equal to the threshold value.

15. The method of claim 1, wherein decoding the current block comprises:
   decoding data representative of a prediction mode for the current block;
   generating a prediction block for the current block using the prediction mode; and
   combining the prediction block with the residual data to reproduce the current block.

16. A device for decoding video data, the device comprising:
   one or more memories configured to store video data and data defining a plurality of signaling methods, the signaling methods comprising:
      a first signaling method specifying a first mapping between a truncated unary codeword and a multiple transform (MT) scheme; and
      a second signaling method specifying a second mapping from side information for the current block to a second transform scheme; and
   a processor implemented in circuitry and configured to:
      determine the first signaling method for a current block of the video data from the plurality of signaling methods;
      decode a truncated unary codeword representing an MT scheme for the current block of the video data;
      determine the MT scheme for the current block as being the MT scheme to which the determined signaling method maps the truncated unary codeword;
      apply the MT scheme to transform coefficients of the current block to produce residual data for the current block of the video data; and
      decode the current block using the residual data.

17. The device of claim 16, wherein the plurality of signaling methods comprise a third signaling method using a one-bit flag to represent one of two transforms of a predefined set of two transforms, and a fourth signaling method using a set of one- or two-bit flags to represent one of three transforms of a predefined set of three transforms, the first signaling method comprising one of the third signaling method or the fourth signaling method, and the MT scheme comprising the one of the two transforms of the predefined set of two transforms or the one of the three transforms of the predefined set of three transforms.

18. The device of claim 16, wherein the processor is configured to decode the truncated unary codeword using context information determined from one or more of a size of the current block, a type for the current block, a prediction mode for the current block, or data for one or more neighboring blocks to the current block.

19. The device of claim 16, wherein the MT scheme comprises a set of transforms of a plurality of sets of transforms, each of the sets of transforms including a respective plurality of transforms, and wherein to apply the MT scheme, the processor is configured to perform each of the plurality of transforms of the set of transforms.

20. The device of claim 16, wherein the MT scheme comprises a horizontal transform and a vertical transform, the vertical transform being different than the horizontal transform.

21. The device of claim 16, wherein to decode the current block, the processor is configured to:
   decode data representative of a prediction mode for the current block;
   generate a prediction block for the current block using the prediction mode; and
   combine the prediction block with the residual data to reproduce the current block.

22. The device of claim 16, further comprising a display configured to display the decoded video data.

23. The device of claim 16, wherein the device comprises one or more of a camera, a computer, a mobile device, a broadcast receiver device, or a set-top box.

24. The device of claim 16, wherein the device comprises at least one of:
   an integrated circuit;
   a microprocessor; or
   a wireless communication device.

25. A computer-readable storage medium having stored thereon instructions that, when executed, cause a processor to:
   determine a signaling method for a current block of video data from a plurality of signaling methods, the signaling methods comprising:
      a first signaling method specifying a first mapping between a truncated unary codeword and a multiple transform (MT) scheme; and
      a second signaling method specifying a second mapping from side information for
   the current block to a second transform scheme,
   wherein the instructions that cause the processor to determine the signaling method comprise instructions that cause the processor to determine the first signaling method for the current block;
   decode the truncated unary codeword representing the MT scheme for the current block of the video data;
   determine the MT scheme for the current block as being the MT scheme to which the determined signaling method maps the truncated unary codeword;
   apply the MT scheme to transform coefficients of the current block to produce residual data for the current block of the video data; and
   decode the current block using the residual data.

26. The computer-readable storage medium of claim 25, wherein the plurality of signaling methods comprise a third signaling method using a one-bit flag to represent one of two transforms of a predefined set of two transforms, and a fourth signaling method using a set of one- or two-bit flags to represent one of three transforms of a predefined set of three transforms, the first signaling method comprising one of the third signaling method or the fourth signaling method, and the MT scheme comprising the one of the two transforms of the predefined set of two transforms or the one of the three transforms of the predefined set of three transforms.

27. The computer-readable storage medium of claim 25, wherein the instructions that cause the processor to decode the truncated unary codeword comprise instructions that cause the processor to decode the truncated unary codeword using context information determined from one or more of a size of the current block, a type for the current block, a prediction mode for the current block, or data for one or more neighboring blocks to the current block.

28. The computer-readable storage medium of claim 25, wherein the MT scheme comprises a set of transforms of a plurality of sets of transforms, each of the sets of transforms including a respective plurality of transforms, and wherein the instructions that cause the processor to apply the MT scheme comprise instructions that cause the processor to perform each of the plurality of transforms of the set of transforms.

29. The computer-readable storage medium of claim 25, wherein the MT scheme comprises a horizontal transform and a vertical transform, the vertical transform being different than the horizontal transform.

30. The computer-readable storage medium of claim 25, wherein the instructions that cause the processor to decode the current block comprise instructions that cause the processor to:
decode data representative of a prediction mode for the current block;
generate a prediction block for the current block using the prediction mode; and
combine the prediction block with the residual data to reproduce the current block.

31. A device for decoding video data, the device comprising:
means for determining a signaling method for a current block of video data from a plurality of signaling methods, the signaling methods comprising:
a first signaling method specifying a first mapping between a truncated unary codeword and a multiple transform (MT) scheme; and
a second signaling method specifying a second mapping from side information for
the current block to a second transform scheme,
wherein the means for determining the signaling method comprises means for determining the first signaling method for the current block;
means for decoding the truncated unary codeword representing the MT scheme for the current block of the video data;
means for determining the MT scheme for the current block as being the MT scheme to which the determined signaling method maps the truncated unary codeword;
means for applying the MT scheme to transform coefficients of the current block to produce residual data for the current block of the video data; and
means for decoding the current block using the residual data.

32. A method of encoding video data, the method comprising:
applying a multiple transform (MT) scheme to residual data for a current block of video data to generate a block of transform coefficients;
determining a signaling method for the current block of the video data from a plurality of signaling methods, the signaling methods comprising:
a first signaling method specifying a first mapping between a truncated unary codeword and the MT scheme; and
a second signaling method specifying a second mapping from side information for the current block to a second transform scheme,
wherein determining the signaling method comprises determining the first signaling method for the current block;
determining the truncated unary codeword to represent the applied MT scheme as being the truncated unary codeword to which the determined first signaling method maps the applied MT scheme;
encoding the determined truncated unary codeword; and
encoding the current block using the block of transform coefficients.

33. The method of claim 32, wherein the plurality of signaling methods comprise a third signaling method using a one-bit flag to represent one of two transforms of a predefined set of two transforms, and a fourth signaling method using a set of one- or two-bit flags to represent one of three transforms of a predefined set of three transforms, the first signaling method comprising one of the third signaling method or the fourth signaling method, and the MT scheme comprising the one of the two transforms of the predefined set of two transforms or the one of the three transforms of the predefined set of three transforms.

34. The method of claim 32, wherein encoding the truncated unary codeword comprises entropy encoding the truncated unary codeword using context information determined from one or more of a size of the current block, a type for the current block, a prediction mode for the current block, or data for one or more neighboring blocks to the current block.

35. The method of claim 32, wherein the MT scheme comprises a set of transforms of a plurality of sets of transforms, each of the sets of transforms including a respective plurality of transforms, and wherein applying the MT scheme comprises performing each of the plurality of transforms of the set of transforms.

36. The method of claim 32, wherein the MT scheme comprises a horizontal transform and a vertical transform, the vertical transform being different than the horizontal transform.

37. The method of claim 32, further comprising:
generating a prediction block according to a prediction method; and
calculating the residual data as a difference between the current block and the prediction block,
wherein encoding the current block comprises:
encoding data representing the prediction method; and
encoding data representing the transform coefficients.

38. A device for encoding video data, the device comprising:
one or more memories configured to store video data and data defining a plurality of signaling methods, the signaling methods comprising:
a first signaling method specifying a first mapping between a truncated unary codeword and a multiple transform (MT) scheme; and
a second signaling method specifying a second mapping from side information for the current block to a second transform scheme; and
a processor implemented in circuitry and configured to:
apply the MT scheme to residual data for a current block of the video data to generate a block of transform coefficients;
determine the first signaling method for the current block of the video data from the plurality of signaling methods;
determine the truncated unary codeword to represent the applied MT scheme as being the truncated unary codeword to which the determined first signaling method maps the applied MT scheme;
encode the determined truncated unary codeword; and
encode the current block using the block of transform coefficients.

39. The device of claim 38, wherein the processor is configured to entropy encode the truncated unary codeword using context information determined from one or more of a size of the current block, a type for the current block, a prediction mode for the current block, or data for one or more neighboring blocks to the current block.

40. The device of claim 38, wherein the MT scheme comprises a set of transforms of a plurality of sets of transforms, each of the sets of transforms including a respective plurality of transforms, and wherein to apply the MT scheme, the processor is configured to perform each of the plurality of transforms of the set of transforms.

41. The device of claim 38, wherein the MT scheme comprises a horizontal transform and a vertical transform, the vertical transform being different than the horizontal transform.

42. The device of claim 38, wherein the processor is further configured to:
  generate a prediction block according to a prediction method; and
  calculate the residual data as a difference between the current block and the prediction block,
  wherein to encode the current block, the processor is configured to:
    encode data representing the prediction method; and
    encode data representing the transform coefficients.

43. The device of claim 38, further comprising a camera configured to capture the video data.

44. The device of claim 38, wherein the device comprises one or more of a camera, a computer, a mobile device, a broadcast receiver device, or a set-top box.

45. The device of claim 38, wherein the device comprises at least one of:
  an integrated circuit;
  a microprocessor; or
  a wireless communication device.

46. The method of claim 1, wherein the side information comprises information representing a size of the current block.

47. The method of claim 1, wherein the side information comprises a number of non-zero coefficients included in the current block.

* * * * *